US010280069B2

(12) United States Patent
Gilbert et al.

(10) Patent No.: US 10,280,069 B2
(45) Date of Patent: *May 7, 2019

(54) DEVICES AND METHODS FOR RECYCLING MATTRESS BOX SPRINGS

(71) Applicant: Environmentally Conscious Recycling, Inc., Portland, OR (US)

(72) Inventors: Vincent Paul Gilbert, Portland, OR (US); Vernon L. Brown, Sandy, OR (US); Denny G. Miller, Milwaukie, OR (US); Edward R. Nelson, Milwaukie, OR (US)

(73) Assignee: Environmentally Conscious Recycling, Inc., Portland, OR (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/136,562

(22) Filed: Apr. 22, 2016

(65) Prior Publication Data

US 2016/0236928 A1    Aug. 18, 2016

Related U.S. Application Data

(63) Continuation of application No. 14/680,759, filed on Apr. 7, 2015, now Pat. No. 9,321,138.

(Continued)

(51) Int. Cl.
*B23P 19/04* (2006.01)
*B68G 15/00* (2006.01)
(Continued)

(52) U.S. Cl.
CPC .............. *B68G 15/00* (2013.01); *A47C 23/00* (2013.01); *B09B 5/00* (2013.01); *B23P 19/04* (2013.01);

(Continued)

(58) Field of Classification Search
CPC . B68G 15/00; B09B 5/00; B23P 19/04; B23P 19/048; A47C 23/00; B30B 9/326
See application file for complete search history.

(56) References Cited

U.S. PATENT DOCUMENTS 3,337,882 A    8/1967 Swatt
4,241,495 A    12/1980 Wakeem
(Continued)

OTHER PUBLICATIONS

"Industrial Resources Box Spring Dismantler" uploaded to Youtube on May 23, 2012, https://www.youtube.com/watch?v=KBTxDdTv-VoE.

(Continued)

*Primary Examiner* — Ryan J. Walters
(74) *Attorney, Agent, or Firm* — McDonnell Boehnen Hulbert & Berghoff LLP

(57) ABSTRACT

A device for removing a set of springs from a mattress box spring including a mattress box spring support, a pushing block support frame secured to the mattress box spring support, a pushing block supported by the pushing block support frame adjacent to the mattress box spring support, a cylinder for extending the pushing block over a mattress box spring positioned on the mattress box spring support belt, wherein the cylinder is operable to extend the pushing block transversely over the mattress box spring to separate springs attached to a frame of the mattress box spring from the frame, and wherein a plurality of forks extend in front of the pushing block transversely to the mattress box spring support for helping to prevent the springs from folding underneath a bottom of the pushing block when the pushing block is extended over the mattress box spring to separate the springs from the frame.

24 Claims, 19 Drawing Sheets

Related U.S. Application Data

(60) Provisional application No. 61/976,393, filed on Apr. 7, 2014.

(51) Int. Cl.
    *B30B 9/32*         (2006.01)
    *A47C 23/00*     (2006.01)
    *B09B 5/00*       (2006.01)

(52) U.S. Cl.
    CPC ............ *B23P 19/048* (2013.01); *B30B 9/326* (2013.01); *Y10T 29/49822* (2015.01); *Y10T 29/53613* (2015.01)

(56) References Cited

U.S. PATENT DOCUMENTS

| | | |
|---|---|---|
| 5,463,808 A | 11/1995 | Harris |
| 5,848,459 A | 12/1998 | Minick |
| 6,721,982 B2 | 4/2004 | Freeman |
| 2010/0229735 A1 | 9/2010 | Deraas et al. |
| 2013/0210311 A1 | 8/2013 | Lanza et al. |
| 2014/0033495 A1 | 2/2014 | Smith et al. |

OTHER PUBLICATIONS

"Mattress Shear boxspring metal spring and wood palette separator" uploaded to Youtube on Sep. 29, 2013, https://www.youtube.com/watch?v=f5Bdzrk7ndY.

"Coil Spring Compactor—Olaf Industries" uploaded to Youtube on Feb. 15, 2013, https://www.youtube.com/watch?v=0v-FZWdY6Eg.

Farmer, Blake, "New Recycling Company Springs From Old Mattresses," NPR, Jan. 18, 2012, 3 pages.

Green Lodging News, "A Close Look at the Current State of Mattress Recycling," http://www.enn.com/pollution/spotlight/33796, Mar. 28, 2008, 5 pages.

Industrial Resources Box Spring Dismantler uploaded to Youtube on Aug. 2, 2011, https://www.youtube.com/watch?v=GH4_m7XCZR4.

Video of Olaf Industries, pre-2014, http://olatindustries.com.

Innovative mattress recycling technology, Coil Spring Compactor—Olaf Industries, Utube video, https://www.youtube.com/watch?v=0v-FZWdY6Eg, Feb. 15, 2013.

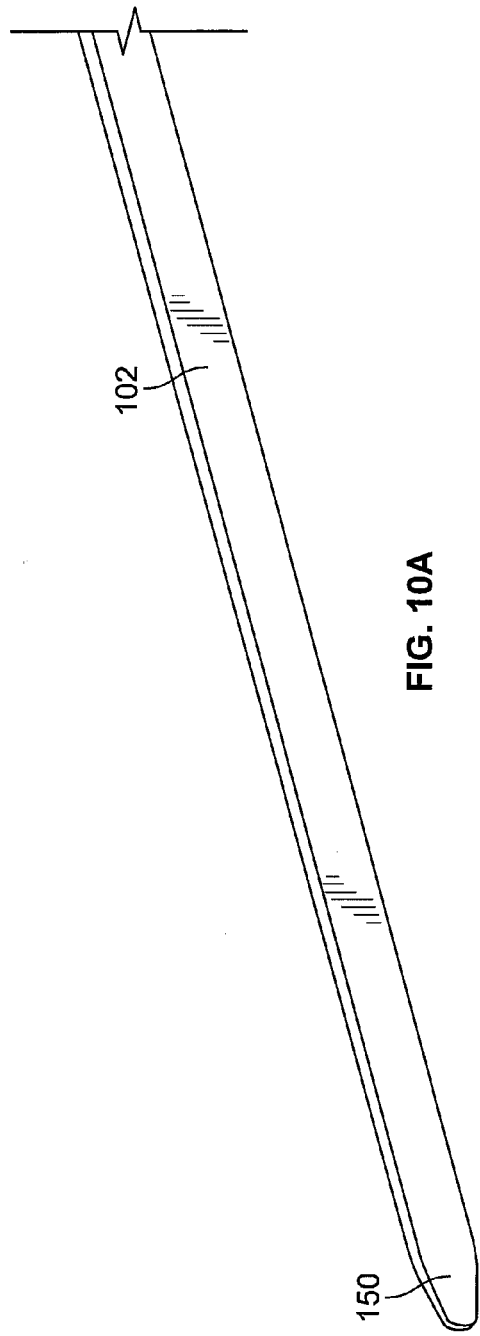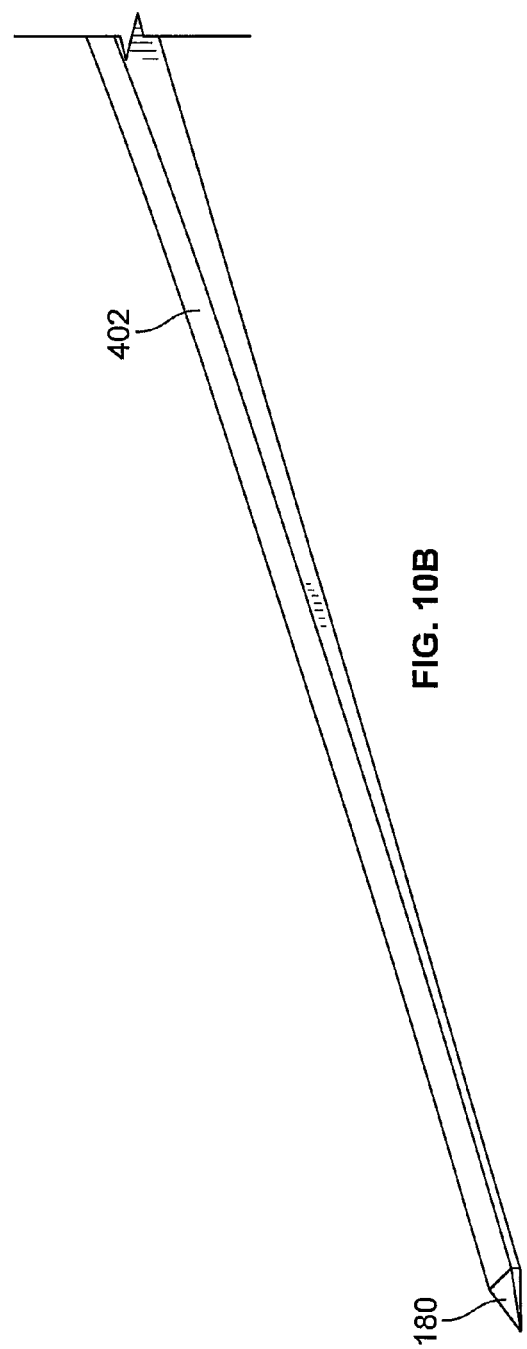

DEVICES AND METHODS FOR RECYCLING MATTRESS BOX SPRINGS

CROSS-REFERENCE TO RELATED APPLICATION

This application claims priority to U.S. Provisional Application No. 61/976,398, filed Apr. 7, 2014, and U.S. patent application Ser. No. 14/680,759 filed on Apr. 7, 2015, issued as U.S. Pat. No. 9,321,138 on Apr. 26, 2016, which are hereby incorporated by reference in their entirety.

BACKGROUND

The present application generally relates to a device and method for recycling a box spring for a mattress, or a mattress. More particularly, the present application relates to a device and method for separating the mattress and box spring into its component parts, such as metal springs, foam, cloth, and wood products.

Typically, mattresses and box springs for mattresses are dumped in landfills, which are used to store the vast majority of municipal solid waste generated in the United States. A single mattress or box spring can take up to 23 cubic feet in a landfill while available landfill space is decreasing. Further, landfill operators find mattresses and box springs difficult to dispose of because of the increased wear and tear on the equipment that handles mattresses and box springs. As a result, some landfill operators are increasing the fees charged for taking mattresses and box springs. Another method of disposing of mattresses and box springs is through incineration which raises significant environmental issues.

Consequently, there is an increased interest in recycling mattresses and box springs, as an alternative to dumping them in landfills or incineration. A typical mattress or box spring includes cloth that may cover the bottom, top and sides. Some type of foam or fluffy filler is typical found within the cover, as well as a set of metal springs, often coil springs. In the case of a box spring, the set of springs are often interconnected to one another and stapled or affixed to a board or lattice made of wood products.

Currently, the recycling of a box springs and mattresses is very labor intensive. In particular, manual laborers may slice open the sides of the mattress and pull away the cloth and the foam from the spring set. The cloth may be sanitized and cleaned and repurposed, or chopped into smaller pieces for further recycling or use. Similarly, the foam material may be removed and baled, or chopped for further recycling or use.

Box springs in particular create a recycling challenge. It is difficult to separate the set of springs, often coil springs, from the board or lattice of wood slats, because the set of springs is stapled or affixed to the board or wood slats with a large number of staples or fasteners. It is difficult and labor intensive to remove the staples from the board or wood slats to separate the set of springs from the board or wood slats. Once the set of springs is removed from the board or wood slats, the wood products can be broken or chopped up for further recycling or use. Similarly, the set of metal springs may be baled or chopped further where they may be recycled with other metal parts (such as staples) and sent for further metal recycling.

In view of the labor intensive process of recycling mattresses and box springs, it would be desirable to automate the recycling process. It would be particularly desirable to provide a device and method for separating the set of springs from the board or wood slats in a box spring.

SUMMARY

In one aspect, a device and method useful for separating a set of springs from a bottom of a mattress is provided that includes a housing, a plurality of suppression fingers extending longitudinally from the housing, that may extend over the bottom of the mattress or box spring and between the springs in the set of springs to hold the bottom of the mattress or box spring in place while a gripping devices grabs the set of springs and pulls upwardly on the set of springs to separate it from the bottom of the mattress or box spring, thereby automating the recycling process and reducing the time and labor required to recycle the box spring or mattress.

In a further aspect, a device for removing a set of springs from a bottom of a mattress is provided including a housing, a plurality of suppression fingers extending longitudinally from the housing, wherein the plurality of suppression fingers are configured to extend over the bottom of the mattress, wherein the plurality of suppression fingers are configured to extend between springs in the set of springs when positioned over the bottom of the mattress, and wherein the plurality of suppression fingers hold the bottom of the mattress beneath the set of springs when a gripping device pulls upwardly on the set of springs to separate the set of springs from the bottom of the mattress.

In a further aspect, a method of recycling a mattress box spring is provided, including the steps of (i) removing cloth from the mattress box spring; and (ii) separating a set of springs having a plurality of interconnected springs from a bottom frame of the mattress box spring by positioning a plurality of suppression fingers that are secured to a housing over the bottom of the frame of the mattress box springs and extending the plurality of suppression fingers between the plurality of interconnected springs and operating a gripping device to grip the set of springs and pull upwardly on the set of springs to remove the set of springs from the bottom frame of the mattress box spring.

In yet a further aspect, a device for removing a set of springs from a mattress box spring is provided including a mattress box spring support, a pushing block support frame secured to the mattress box spring support, a pushing block supported by the pushing block support frame adjacent to the mattress box spring support, a cylinder for extending the pushing block over a mattress box spring positioned on the mattress box spring support, wherein the cylinder is operable to extend the pushing block transversely over the mattress box spring positioned on the mattress box spring support to separate springs attached to a frame of the mattress box spring from the frame of the mattress box spring, and wherein a plurality of forks extend in front of the pushing block transversely to the mattress box spring support for helping to prevent the springs from folding over and extending beneath a bottom of the pushing block when the pushing block is extended over the mattress box spring to separate the springs from the frame of the mattress box spring.

In another aspect, a method of separating springs from a frame of a mattress box spring is provided including the steps of (i) providing a device including a mattress box spring support, a pushing block support frame secured to the mattress box spring support, a pushing block supported by the pushing block support frame adjacent to the mattress box spring support, a cylinder for extending the pushing block over a mattress box spring positioned on the mattress box spring support, wherein the cylinder is operable to extend the pushing block transversely over the mattress box spring positioned on the mattress box spring to separate springs attached to a frame of the mattress box spring from the frame of the mattress box spring, and wherein a plurality of forks extend in front of the pushing block transversely to mattress box spring support for helping to prevent the springs from folding over and extending beneath a bottom of the pushing block when the pushing block is extended over the mattress box spring to separate the springs from the wooden frame of the mattress box spring; (ii) extending the pushing block transversely from the mattress box spring support to separate springs on the mattress box spring from a frame of the mattress box spring; and (iii) retracting the pushing block from over the mattress box spring support.

BRIEF DESCRIPTION OF THE DRAWINGS

Exemplary embodiments of the invention are described herein with reference to the drawings, wherein like parts are designated by like reference numerals, and wherein:

FIG. 10A is a perspective view of suppression finger 102, according to an example embodiment;

FIG. 10B is a perspective view of suppression finger 402, according to an example embodiment;

DETAILED DESCRIPTION

The present embodiments are directed to a device and method for recycling mattresses, and box springs. As used herein, the term "mattress" refers to both a mattress and a mattress box spring, although the term "box spring" refers to a mattress box spring having a rigid bottom and a set of springs attached to the rigid bottom. In some embodiments, a recycling device having a plurality of suppression fingers are used to hold down the bottom of the mattress as a gripping device is used to grip the set of springs and then pull upwardly to separate the set of springs from the bottom of the mattress, which may be rigid bottom in the case of a box spring.

The suppression fingers are attached to a housing, wherein the term "housing" to be construed broadly to include any member to which the suppression fingers may be secured. The housing may be a stationary device, with the bottom of mattress moved into position beneath the bottom of the mattress. Alternately, the suppression fingers may be moved into position over a stationary mattress.

Figure 1:
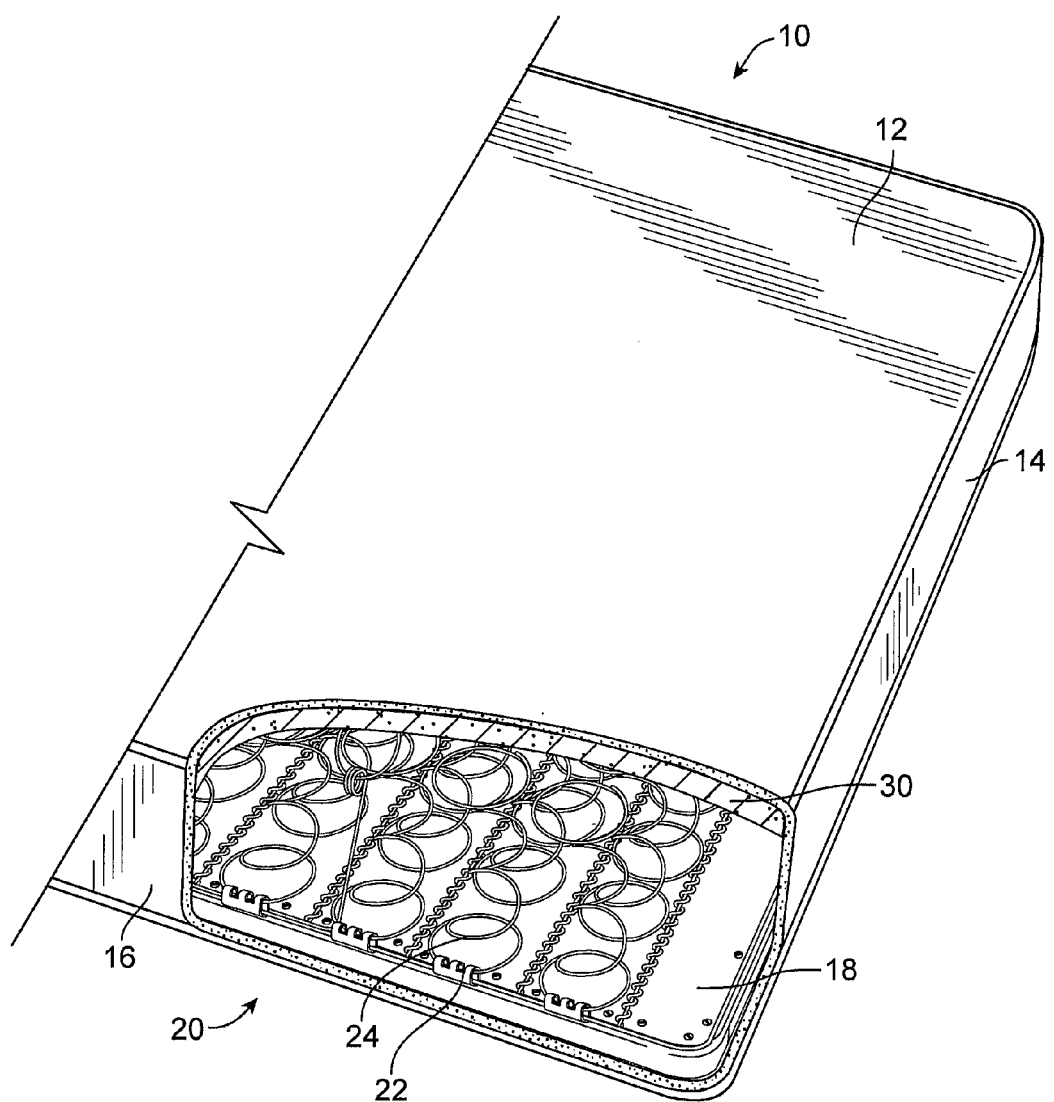
FIG. 1 is a perspective view with cut-away of a box spring 10, according to an example embodiment.

Example embodiments are shown in FIGS. 1-11. FIG. 1 is a perspective side view with cut-away of a typical box spring 10. Box spring 10 includes a cloth cover 12, and cloth side 14 and cloth end 16. Foam padding 30 is positioned beneath the cloth cover 12. A rigid bottom 18 is positioned beneath a set of springs 20, having a plurality interconnected springs 24. The set of springs 20 are attached to the rigid board with fasteners 22.

Figure 2:
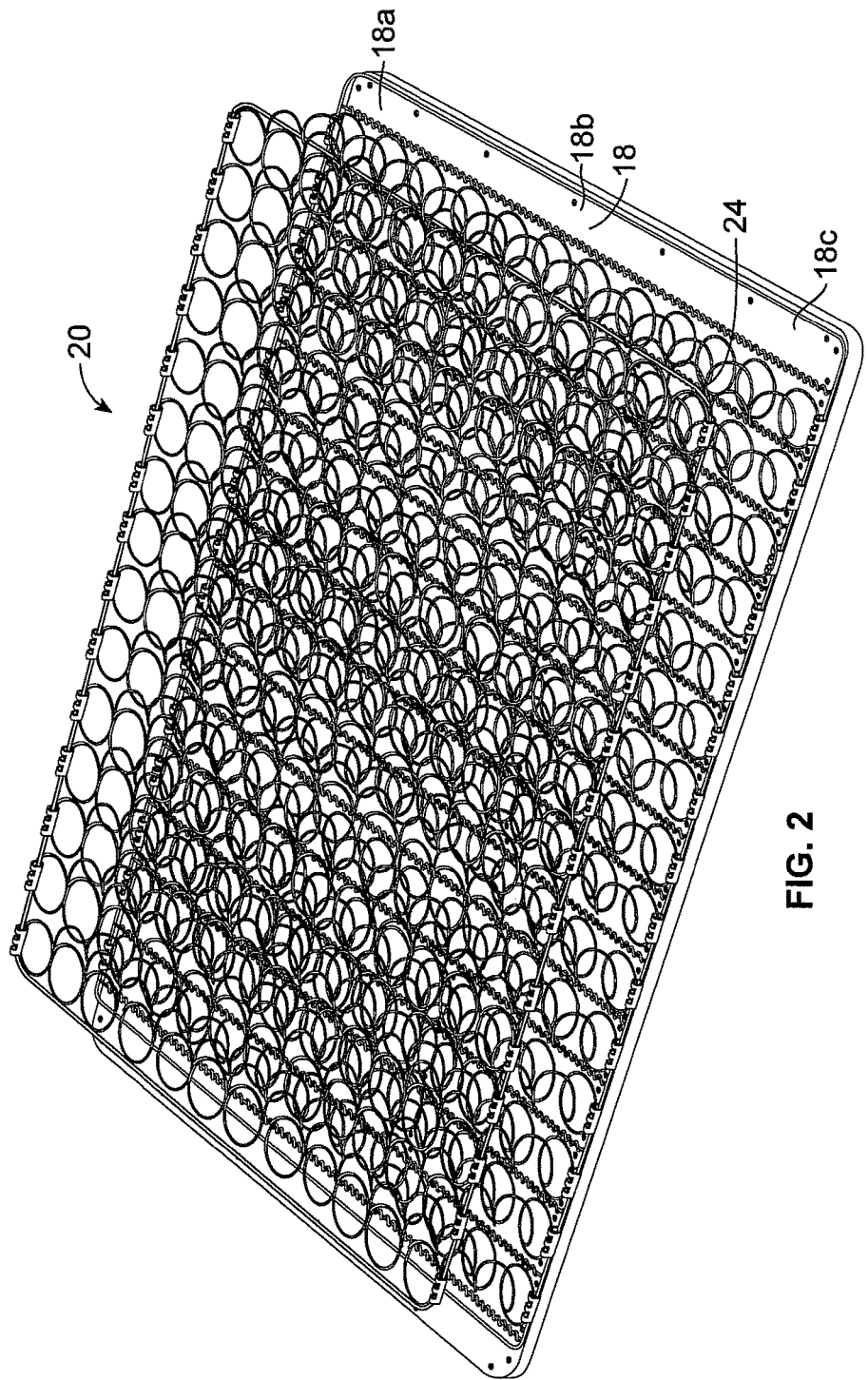
FIG. 2 is a perspective view of box spring 10 shown in FIG. 1, with cloth and foam removed, according to an example embodiment.

FIG. 2 is a perspective view of box spring 10 shown in FIG. 1, with cloth and foam removed to show the set of springs 20 secured to rigid bottom 18. Rigid bottom 18 has periphery portions 18a and 18c, with a central portion 18b. As described in greater detail below, in operation, suppression fingers from a recycling device may be placed over the portions 18a, 18b, and 18c (they could be placed over other or different portions as well) to hold the rigid bottom 18 down as a gripping device pulls the set of springs 20 upwardly to separate the set of springs 20 from rigid bottom 18.

It will be appreciated that box springs come in a variety of sizes and configurations. For example, the rigid bottom 18 could be a solid board, or interconnected connected slats. The rigid bottom 18 could be made of particle board, wood, or rigid plastic, and the term "board" should be construed broadly to include any rigid object or objects that can serve a rigid bottom for a box spring. Furthermore, the set of springs may also come in a variety of configurations. For example, the set of springs could comprise interconnected coil springs, or any type of interconnected wire that can be used to support a mattress. Moreover, a variety of other methods may be used to secure the set of springs 20 to the rigid bottom 18. For example, staples, tacks, screw, or nails may be used.

Figure 3:
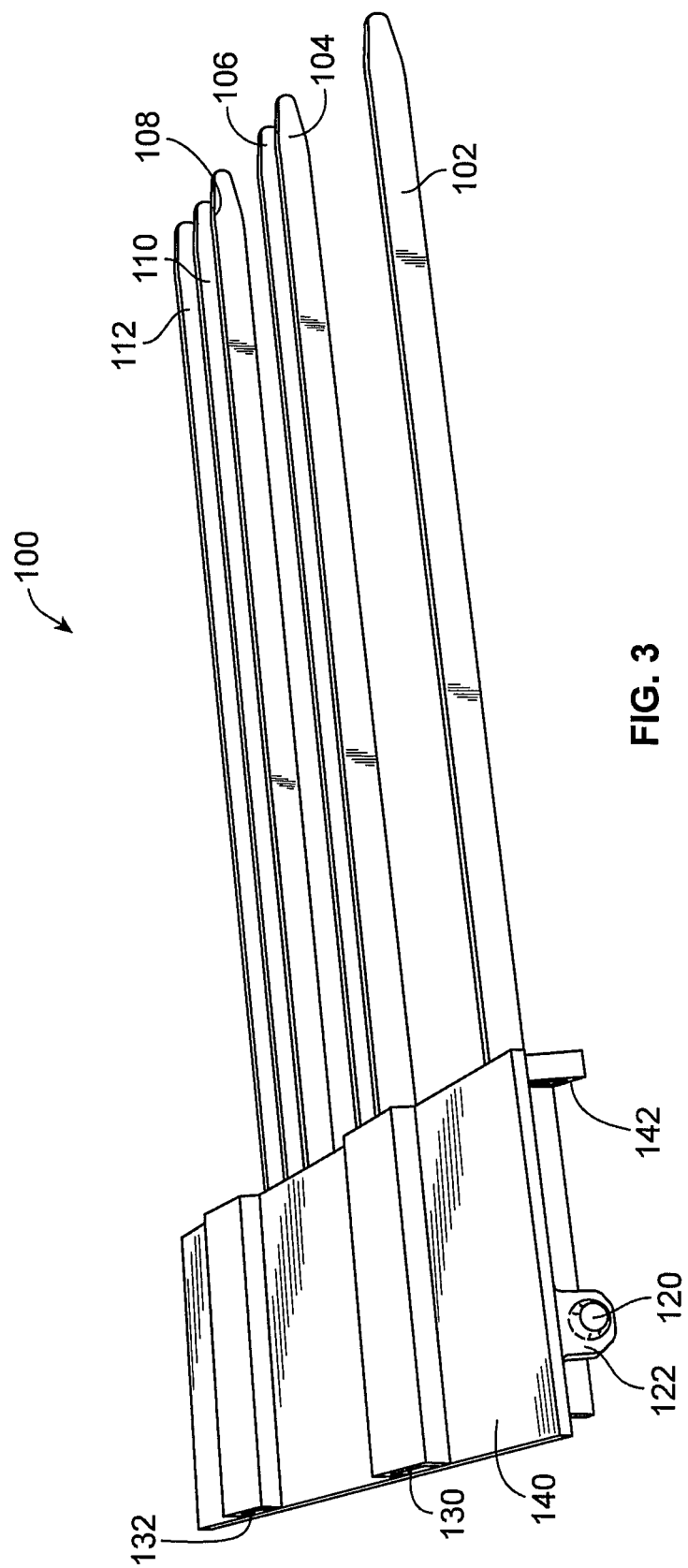
FIG. 3 is a perspective top right side view of recycling device 100, according to an example embodiment.
Figure 4:
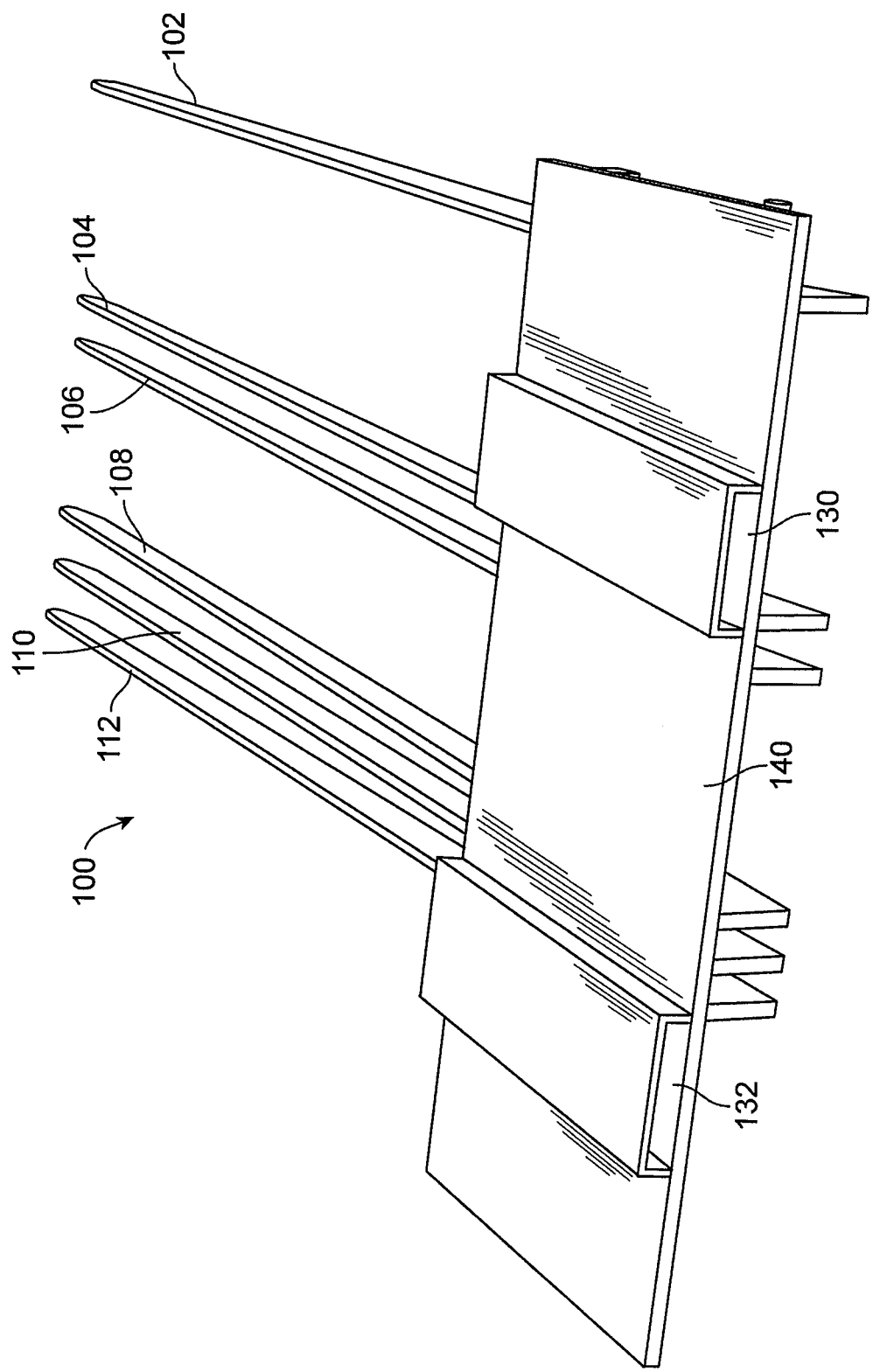
FIG. 4 is another perspective top rear view of recycling device 100 shown in FIG. 3.
Figure 5:
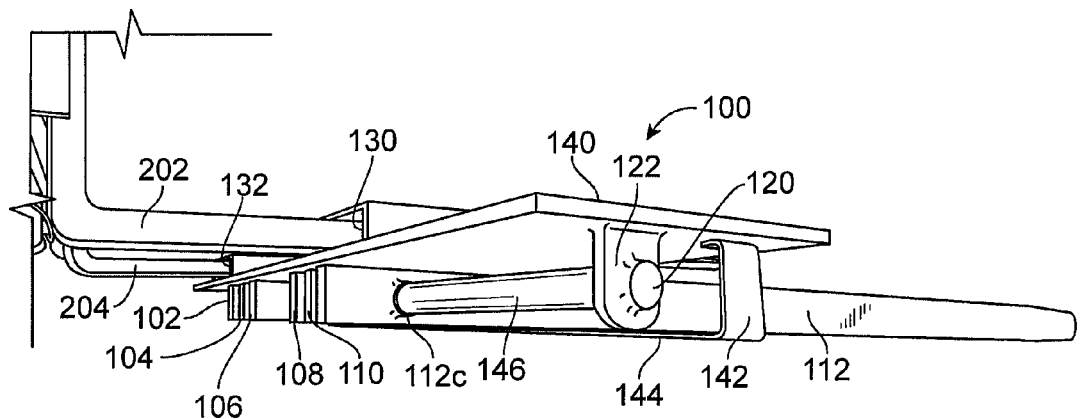
FIG. 5 is bottom rear view of recycling device 100 shown in FIGS. 3 and 4.
Figure 6:
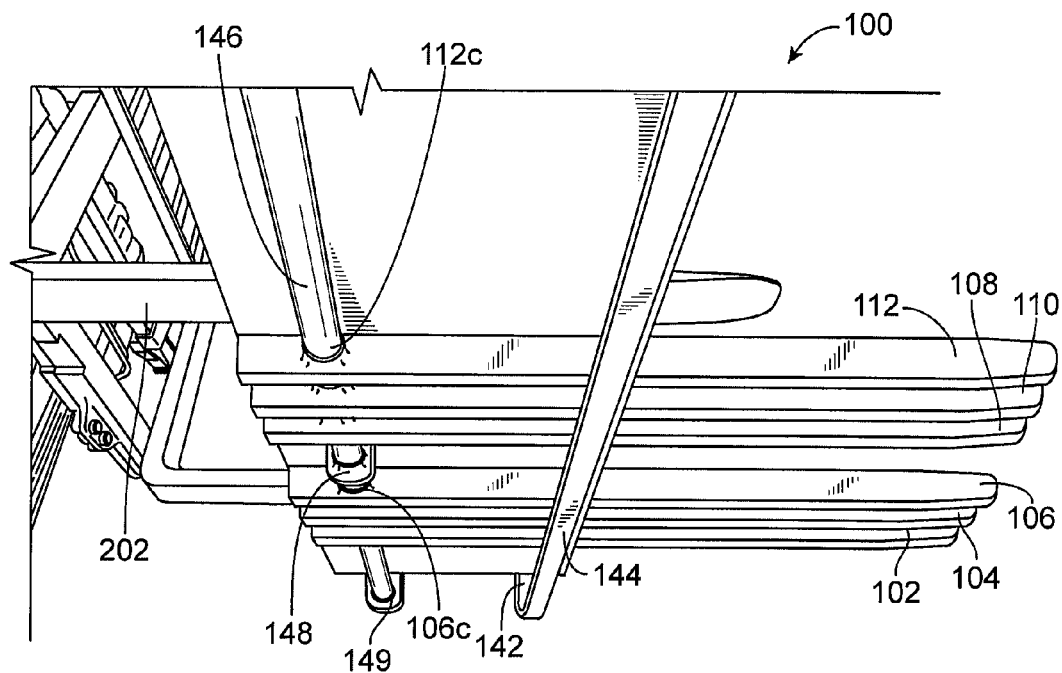
FIG. 6 is a bottom right side view of recycling device 100 shown in FIGS. 3-5.

FIGS. 3-6 are directed to a particular embodiment of a recycling device that may be used in a recycling process. FIG. 3 is a perspective top right side view of recycling device 100; FIG. 4 is a perspective top rear view of recycling device 100; FIG. 5 is bottom rear view of recycling device 100; and FIG. 6 is a bottom right side view of recycling device 100, according to an example embodiment.

In this embodiment, suppression fingers 102, 104, 106, 108, 110, and 112 are shown extending longitudinally from housing 140. Suppression fingers 102, 104, 106, 108, 110, and 112 are secured to housing 140. In this example, they are secured to a first laterally extending member 146 (see FIGS. 5 and 6) that extends from one side of the housing 140 to the other. In this example, the first laterally extending member 146 has an end 120 that is welded to a first flange 122 positioned on the housing 140, and is also welded to a second flange 149 (shown in FIG. 6) located on an opposite side of the housing. In this example, first laterally extending member 146 is also secured to third flange 148 (shown in FIG. 6) positioned on housing 140.

In this embodiment, first laterally extending member 146 is shown as a circular member, and each of the suppression fingers 102, 104, 106, 108, 110, and 112 may have a hole at an end thereof, such as hole 106c or hole 112c through which the first laterally extending member 146 passes through. With this configuration, to accommodate different size mattresses or box springs, the suppression fingers 102-112 may be moved laterally with respect to housing 140. The first laterally extending member may also have other cross-sections other than round, such as square, rectangular, etc.

In addition, as shown in FIGS. 5 and 6 a second laterally extending member 144 having ends 142 extends laterally from one side of the housing 140 to the other. Suppression fingers 102-112 rest on top of the second laterally extending member 144 to maintain the suppression fingers 102-112 extending forward in a longitudinal direction. The second laterally extending member 144 may also have various geometries. For example, 2 or 3 inch square Kelly bar may be used to support the suppression fingers.

In this embodiment, housing 140, suppression fingers 102-112, components of housing 140, and forklift blade holders 130 and 132 are comprised of steel plate, which may be 1 inch thick. However, a variety of other materials may be used for these components that are suitable for holding down the rigid bottom 18 of the box spring during separation of the set of springs 20 from the rigid bottom 18. Such materials may include aluminum, plastic, composite materials, etc.

As shown in FIGS. 3 and 4, forklift blade holders 130 and 132 are shown positioned on housing 140. Forklift blades of a forklift may be inserted into forklift blade holders 130 and 132 to move the recycling device 100 into proper position with respect to a mattress or box spring.

Figure 7:
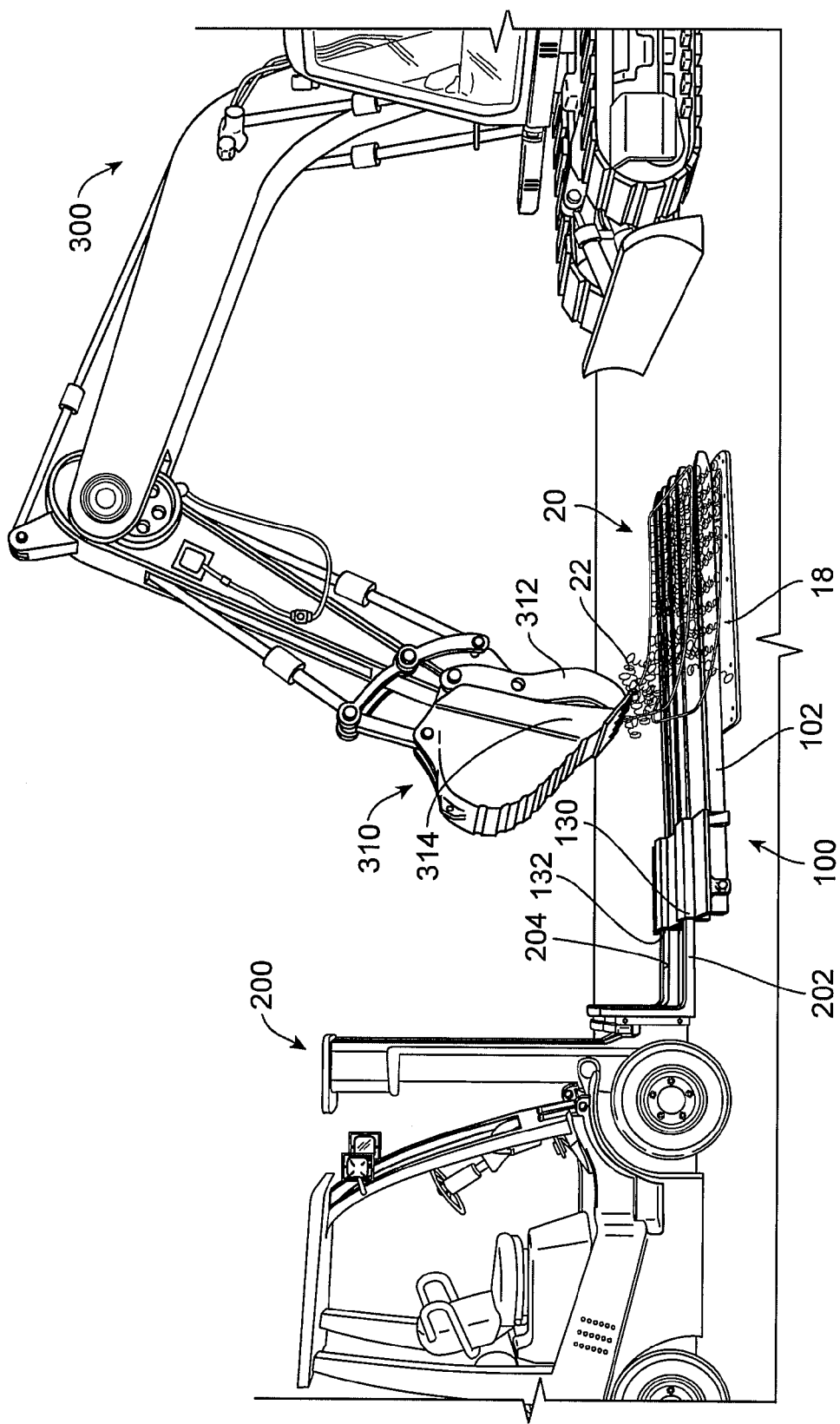
FIG. 7 is a perspective side view of recycling device 100 being used in a recycling process, according to an example embodiment.

FIG. 7 is a perspective side view of recycling device 100 being used in a recycling process, according to an example embodiment. In this embodiment, forklift blades 202 and 204 are inserted in forklift blade holders 130 and 132 respectively. Forklift 200 may be used to position recycling device 100 with respect to the set of springs 20 secured to rigid bottom 18. As will be appreciated the suppression blades 102-112 are positioned over rigid box spring bottom 18 and extend between springs 22 of set of springs 20. In this example, the suppression forks 102-112 extend all of the way over both ends of the rigid box spring board 18. However, in embodiments, the suppression fingers may next extend the entire length of the box spring board 18. However, preferably in those embodiments, the suppression fingers extend over more than 50% of the length of the rigid box spring board 18.

In FIG. 7, a backhoe 300 is shown having a gripping member 310 comprised of main finger 314 and gripping finger 312 that may be operated to grip the springs 20 in the set of springs 20. Once the set of springs are gripped between the main finger 314 and the gripping finger 312, the gripping member 310 may be pulled away from the rigid bottom 18 to separate the set of springs 20 from the rigid bottom 18 as the suppression fingers hold the rigid bottom in place. In one mode of operation, the gripping member 310 grips the set of springs 20 at an end furthest from the cab of backhoe 300. The gripping member 310 may then be operated to pull upwardly and towards the cab of backhoe 300. However, in other embodiments, the gripping device may grip other portions of the set of springs 20 and/or pull upwardly and away from the cab of backhoe 300.

While a backhoe is shown as an illustrative example, any other device suitable for gripping the set of springs 20 may be used. A forklift is one mode of positioning the recycling device over a mattress or box spring. However, as discussed below, there are numerous other possible ways to position the recycling device with respect to the mattress or box spring.

For example, FIG. 6A is a perspective view of a box spring 20 being pushed into position adjacent recycling device 400, according to an example embodiment. In this embodiment, a recycling device 400 is used having housing 440 that is secured to a floor 450 using bolts 460 and 462. Other methods of securing the housing 440 to the floor may also be used, for example using straps. In this embodiment, housing 440 is stationary, with suppression fingers including suppression fingers 402 and 404 extending longitudinally from housing 440.

In this embodiment, the set of spring 20 secured to rigid bottom 18 are mechanically pushed towards housing 440 in the direction of arrow 60 using arm 70 and push member 72. Once the set of springs 20 and rigid bottom 18 are moved into a desired position with suppression fingers extending over the rigid board and between springs 22 of the set of springs 20, the gripping device 310 may be operated to have main finger 314 and gripping finger 312 grip the set of springs 20 and pull the set of springs 20 to separate the set of springs 20 from rigid bottom 18.

Figure 8A:
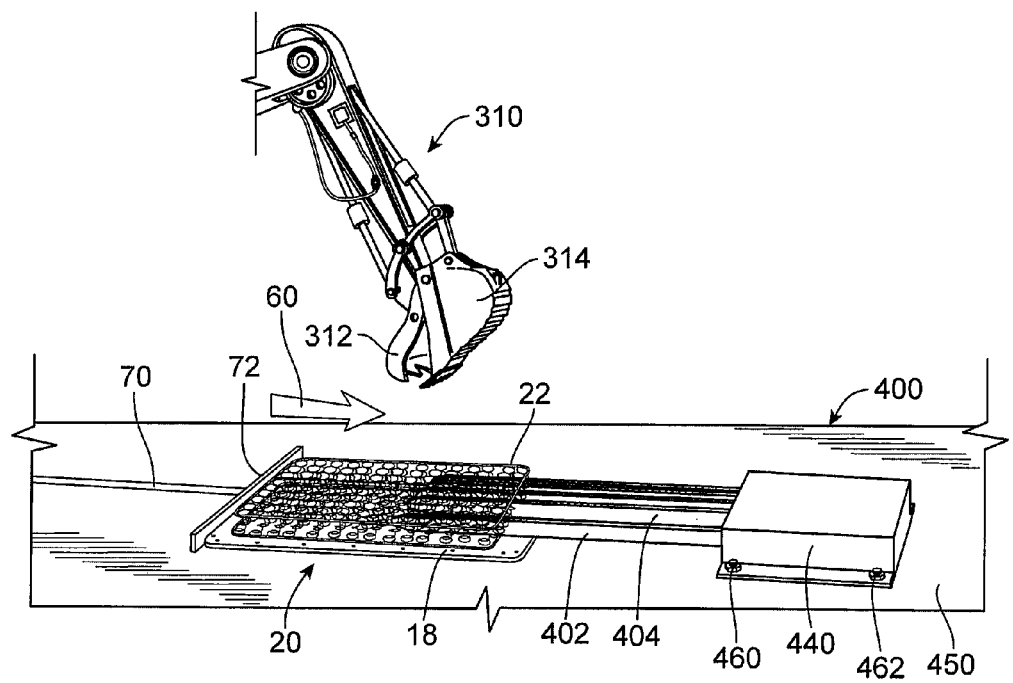
FIG. 8A is a perspective view of a box spring being pushed into position adjacent recycling device 400, according to an example embodiment.
Figure 8B:
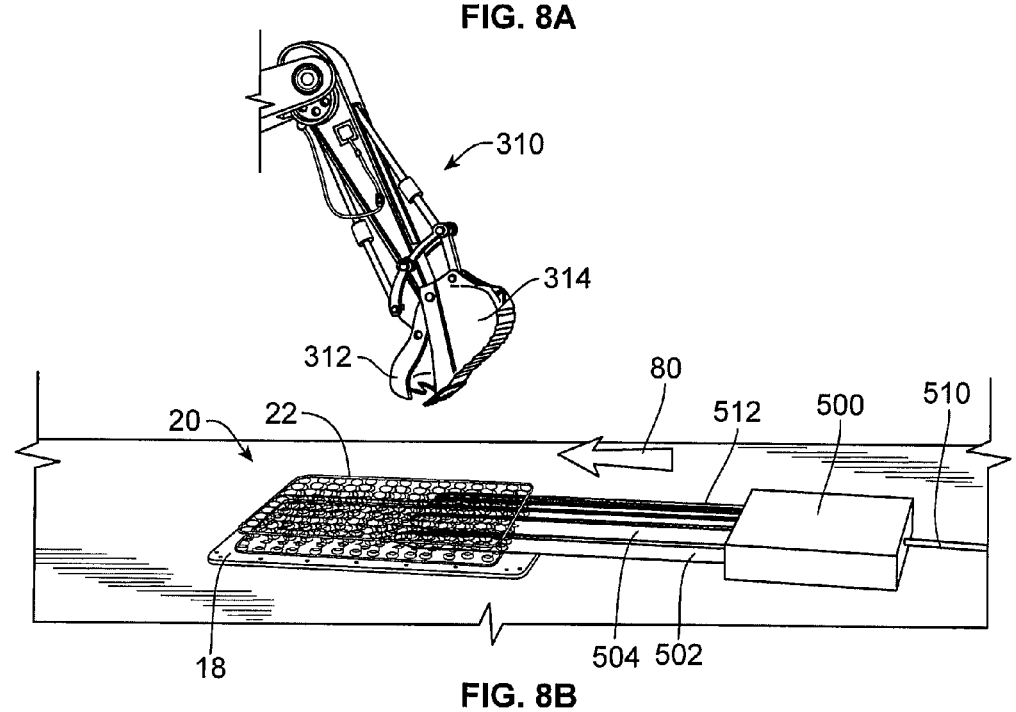
FIG. 8B is perspective view of recycling device 500 being pushed into position over box spring, according to an example embodiment.

FIG. 8B is perspective view of recycling device 500 being pushed into position over set of springs 20 and rigid board 18 of a box spring 20, according to an example embodiment. In this embodiment, a recycling device 500 is used having that is moveable by mechanical arm 510 to move suppression fingers including longitudinally extending suppression fingers 502 and 504 towards set of springs 20 and rigid bottom 18 in a direction of arrow 80.

Once the set of springs 20 and rigid bottom 18 are moved into a desired position with suppression fingers extending over the rigid bottom 18 and between springs 22 of the set of springs 20, the gripping device 310 may be operated to have main finger 314 and gripping finger 312 grip the set of springs 20 and pull the set of springs 20 to separate the set of springs 20 from rigid bottom 18.

In FIGS. 8A and 8B, the gripping device 310 is shown as the gripping device in FIG. 7. However, any number of different gripping devices, stationary or moveable, may be used to grip the set of springs, as gripping device 310 is shown for illustrative purposes only.

Figure 9A:
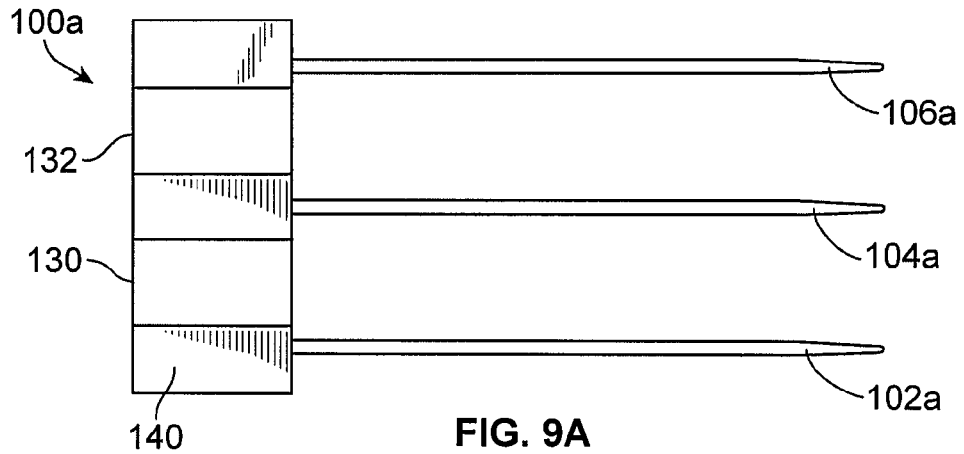
FIG. 9A is a top view of recycling device 100a having three suppression fingers, according to an example embodiment.
Figure 9B:
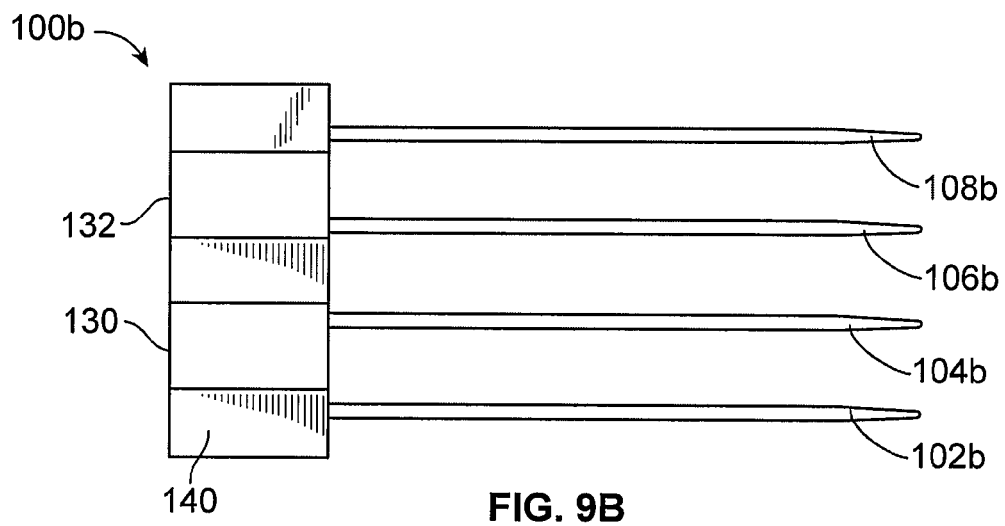
FIG. 9B is a top view of recycling device 100b having four suppression fingers, according to an example embodiment.
Figure 9C:
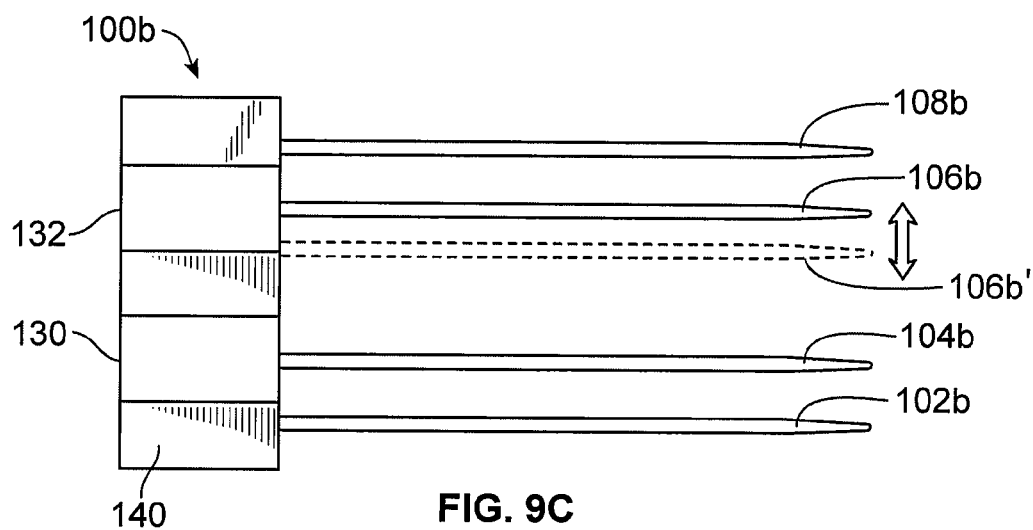
FIG. 9C is a top view of recycling device 100c having suppression fingers that are laterally movable with respect to the housing 140, according to an example embodiment.

The recycling device illustrated in FIGS. 3-6 show six suppression fingers, however in some embodiments a lesser or greater number of suppression fingers may be used. For example, FIG. 9A is a top view of recycling device 100a having three suppression fingers 102a, 104a, and 106a extending longitudinally from housing 140. Housing 140 also includes forklift blade holders 130 and 132. FIG. 9B is a top view of recycling device 100b having four suppression fingers 102b, 104b, 106b, and 108b extending longitudinally from housing 140. Housing 140 also includes forklift blade holders 130 and 132. FIG. 9C is a top view of recycling device 100b shown in FIG. 9B illustrating the lateral movement of the suppression fingers with respect to housing 140. In particular, suppression finger 106b is shown having been moved laterally from position 106b'. The ability to laterally move the suppression fingers is useful for accommodating the various size mattresses that may be recycled.

FIG. 10A is a perspective view of suppression finger 102 having a slightly tapered end 150 useful for extending between the springs of a box spring. FIG. 10B is a perspective view of suppression finger 402, having a more pointed end 180, also useful for moving the suppression finger 402 into position between the springs of a box spring.

Figure 11:
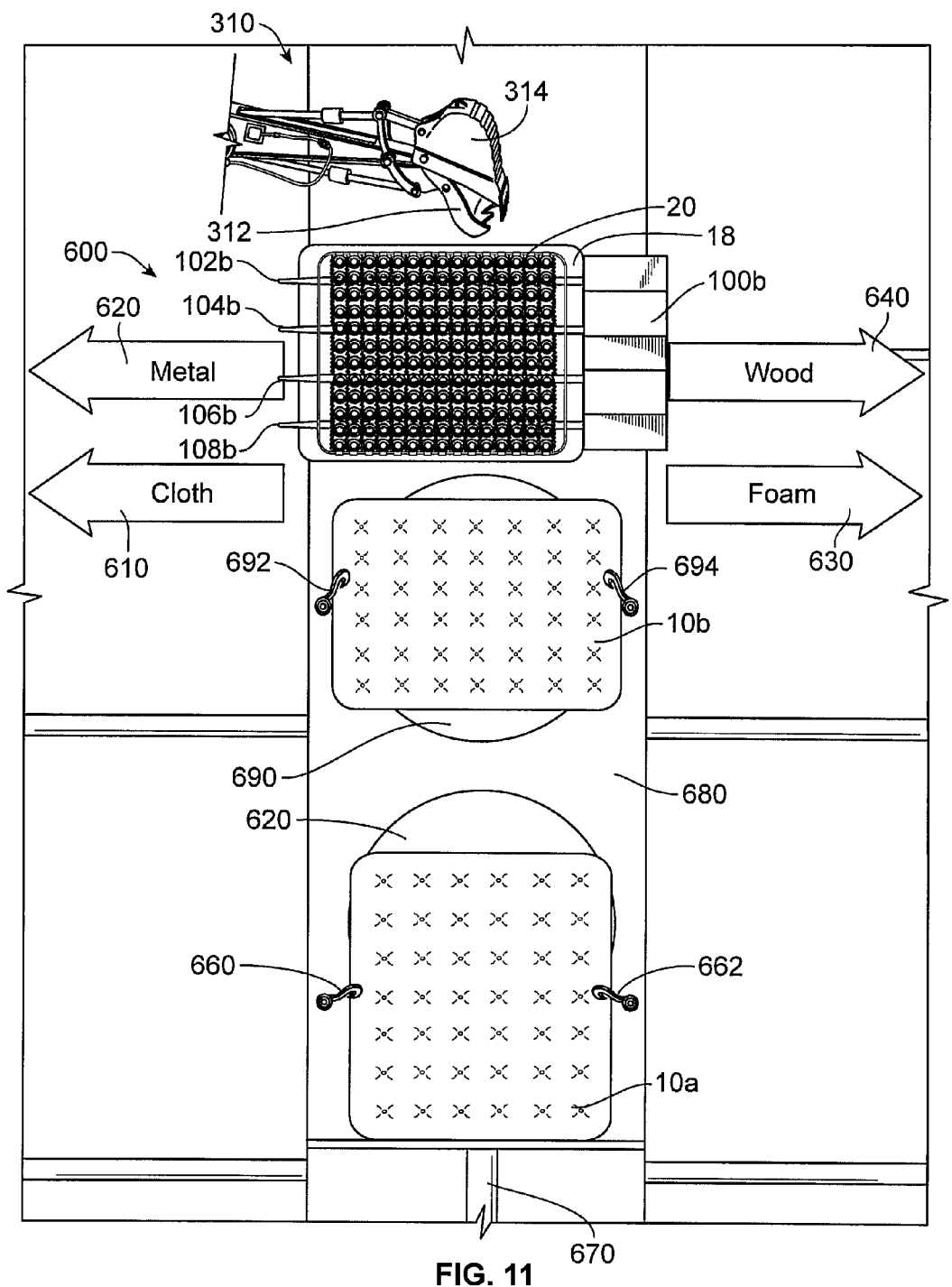
FIG. 11 is a top view showing a recycling operation, according to an example embodiment.

FIG. 11 is a top view showing an automated recycling operation 600, according to an example embodiment. In this exemplary process, box spring 10a is shown positioned on movable conveyor 680. Movable arm 670 may be used to push box spring 10a onto turntable 620. Cutters 660 and 662 may be used to cut slits in the sides of box spring 10a as it moves down the conveyor line. Cloth and foam may be removed from the box spring 10a at this point, while turntable 620 is turned to position the box spring 10a in a desired location. A second box spring 10b is shown positioned further down the conveyor line where it has been positioned on turntable 690. As it moves down the conveyor line, cutters 692 and 694 may be used to cut the ends of box spring 10b. Further cloth and foam can be removed at this point. The removal of cloth and foam can be further automated using one or more suction devices, if desired.

Recycling device 100b is positioned further down the conveyor line. Suppression fingers 102b, 104b, 106b, and 108b are shown extending from recycling device 100b and extending between set of springs 20 over rigid bottom 18. A gripping device 310 having main finger 314 and gripping finger 312 may be used to grip set of springs 20 and separate the set of springs 20 from rigid bottom 18.

This automated recycling system 600 may be used to recycle mattresses and box springs, and separate cloth represented by arrow 610, metal represented by arrow 620, foam represented by arrow 630, and wood products represented by arrow 640.

FIGS. 12-20 are directed to an alternate mattress box spring recycling device and method of separating the springs from the frame of a mattress box spring.

Figure 12:
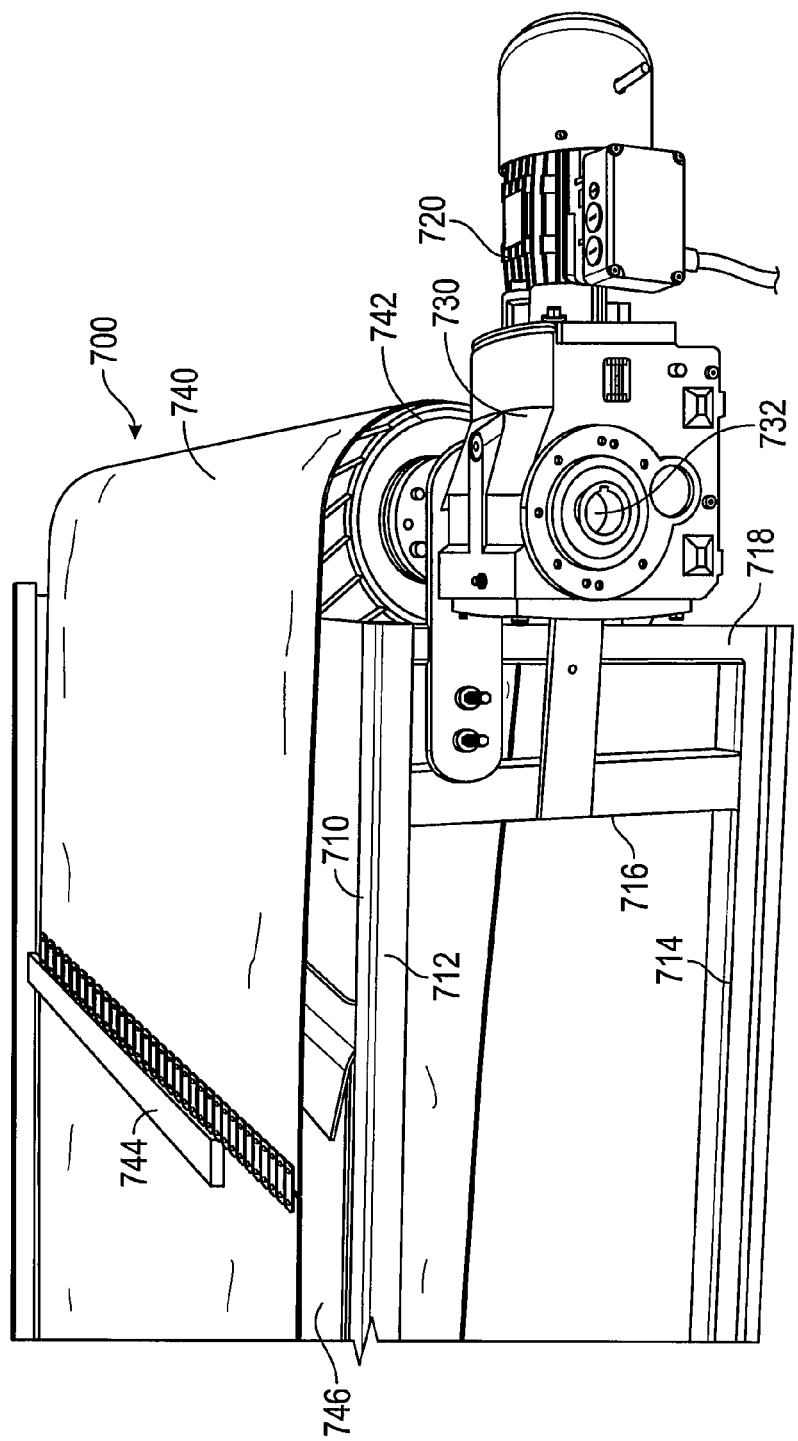
FIG. 12 is a perspective side view of the rear portion of conveyor belt system 700, according to an example embodiment.

FIG. 12 is a perspective side view of the rear portion of conveyor belt system 700, according to an example embodiment. Conveyor belt system 700 includes a conveyor belt frame 710 used to support conveyor roller 742, conveyor belt 740, and conveyor belt support member 746. Conveyor roller 742 is rotated about axis 732 by motor 720 and gear box 730. Motor 720 may be a 2.5 horsepower electric motor, although other types of motors or rotating devices may also be used to cause rotation of convey roller 742. Conveyor belt 740 may be 75 inches wide, providing the ability to handle twin, full, and queen-sized mattress box springs.

Conveyor belt frame 710 may be constructed of upper and lower horizontal support members 712, 714 that are attached to vertical support members 716, 718. In this embodiment, the upper and lower horizontal support members 712, 714 are welded to the vertical support members 716, 718, although they could also be bolted together. In this embodiment, tubular steel is used for the horizontal support members 712, 714, and vertical support members 716, 718. Other configurations may also be used to construct conveyor belt frame 710.

A raised cleat 744 is secured to conveyor belt 740 that operates to abut a mattress box spring in the event the mattress box spring slips on the conveyor belt 740, to move the mattress box spring down the conveying line as the conveyor belt 740 moves forward. The raised cleat 744 also provides a visual cue as to when the mattress box spring is properly positioned in front of a pushing block that may be operated to extend transversely over the frame of the mattress box spring to separate the springs from the frame of the mattress box spring. The mattress box springs are loaded onto the conveyor belt 740 at the rear end of conveyor belt system 700 illustrated in FIG. 12. It will be appreciated that the front end of the conveyor belt system may have a similar conveyor roller as rear conveyor roller 742.

Figure 13:
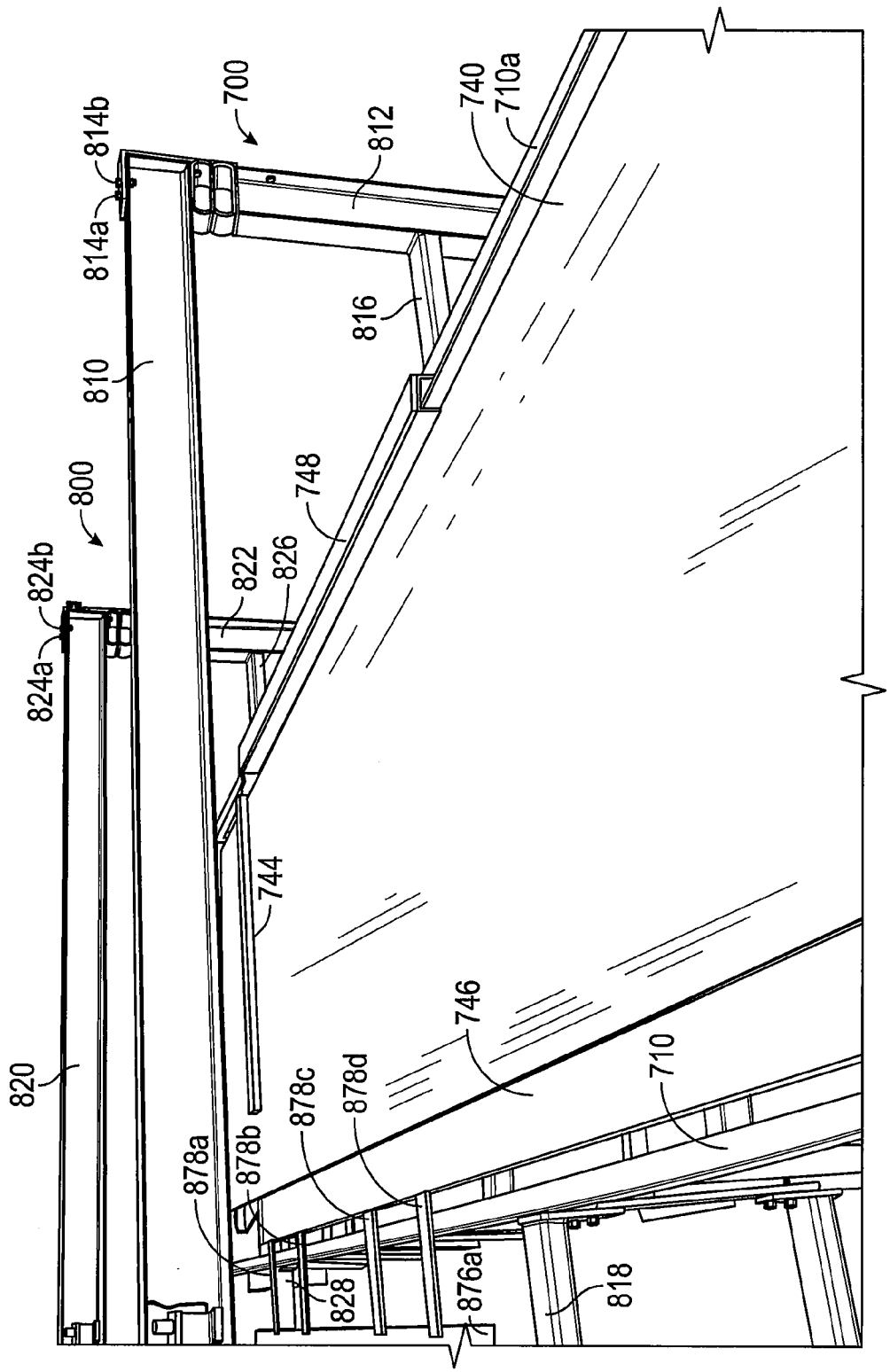
FIG. 13 is a perspective forward looking view from the rear portion of conveyor belt system 700 shown in FIG. 12, with pushing block support frame 800 transversely extending across the conveyor belt system 700.

FIG. 13 is a perspective forward looking view from the rear portion of conveyor belt system 700 shown in FIG. 12, with pushing block support frame 800 transversely extending across the conveyor belt system 700. Pushing block frame 800 includes transversely extending cross members 810, 820. Cross member 810 is secured to vertical support 812 with bolts 814a and 814b, and cross member 820 is secured to vertical support 822 with bolts 824a and 824b. The components could also be welded together, although a bolted connection advantageously provides a greater ability to dismantle and move the entire assembly if required, or to ship to a customer to build the assembly on site.

Another horizontal support member 816 is secured to the vertical support 812 and also secured to conveyor belt frame 710a. On the opposite side, horizontal support member 818 is secured to another vertical support 830 (shown in FIG. 14) and also secured to conveyor belt frame 710. Horizontal support members 816, 818 are also bolted to conveyor belt frames 710, 710a but could also be welded or otherwise secured, although the bolted connections provides significant advantages in term of dismantling and shipping.

Similarly, horizontal support member 826 is secured to the vertical support 822 and also secured to conveyor belt frame 710a. On the opposite side, horizontal support member 828 is secured to another vertical support 840 (shown in FIG. 14) and also secured to conveyor belt frame 710. Horizontal support members 826, 828 are also bolted to conveyor belt frames 710, 710a but could also be welded or otherwise secured, although the bolted connections provides significant advantages in term of dismantling and shipping.

On the left side of FIG. 13, a shearing plate 876a and extending forks 878a-d of pushing block 874 (shown in FIG. 14) are shown positioned adjacent conveyor belt 740 prior to being extended across the conveyor belt 740 where they operate to separate the springs of a mattress box spring from the frame of the mattress box spring. On the opposite side of the conveyer belt 740 from the pushing block 874 is positioned an abutment 748 that is secured to the top of conveyor belt frame member 710a. In this example, the abutment 748 is welded to frame member 710a, but could also be bolted or otherwise attached. During the process of removing the springs from the frame of the mattress box spring, the abutment 748 provides a backstop to prevent the frame of the mattress box spring from moving transversely as the shearing plate 876a of the pushing block 874 separates the springs from the frame of the mattress box spring.

Figure 14:
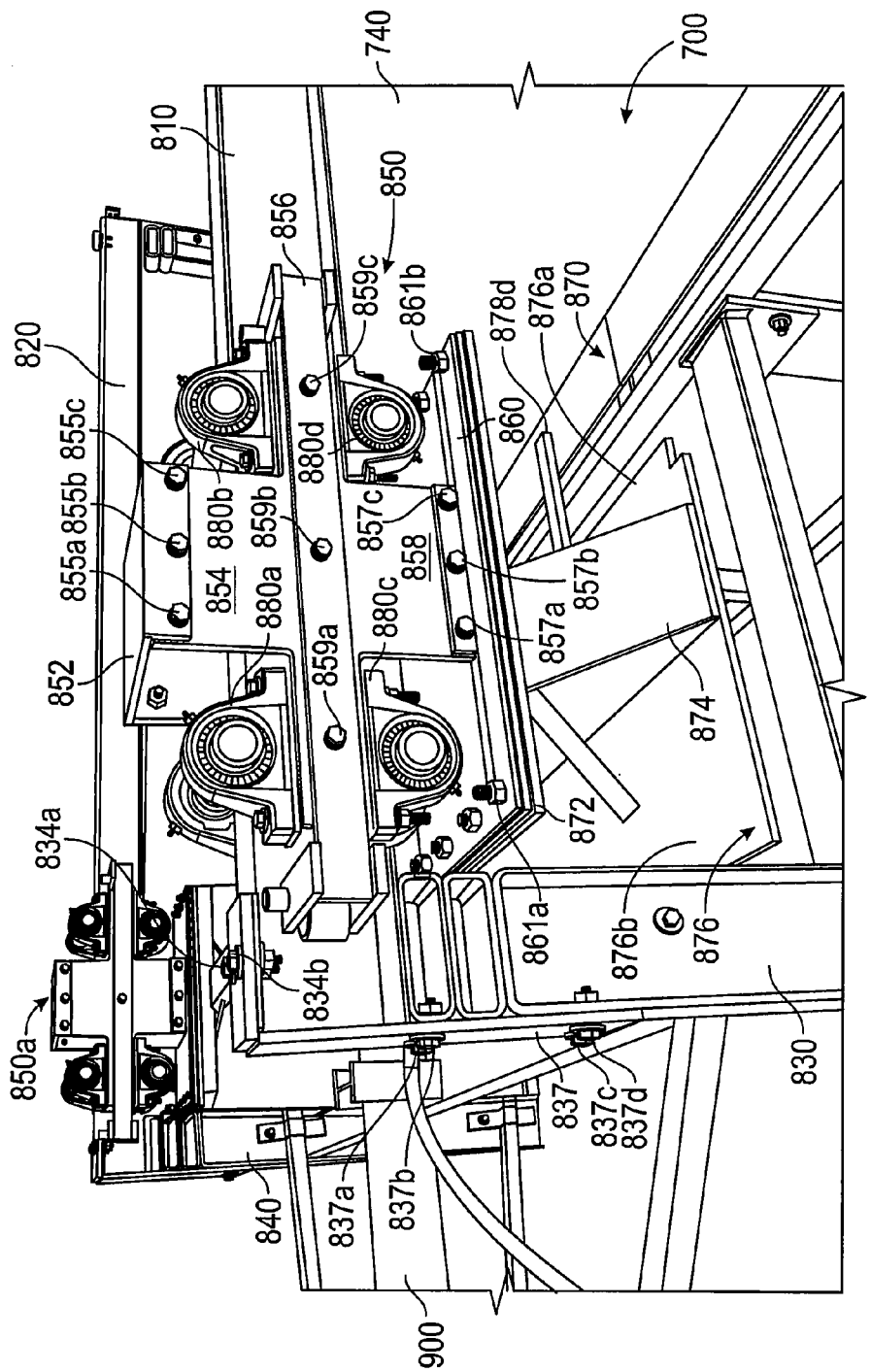
FIG. 14 is a perspective view looking from the rear portion of conveyor belt system 700 providing a view of pushing block support frame 800.

FIG. 14 is a perspective view looking from the rear portion of conveyor belt system 700 providing a view of pushing block support frame 800. In this embodiment, pushing block support frame 800 includes a bearing assembly 850 shown positioned on transversely extending cross member 810 which is an I-beam. Pushing block support frame 800 also includes an identical bearing assembly 850a shown positioned on transversely extending cross member 820 which is also an I-beam. I-beams 810, 820 may have the dimensions of having a 6 inch height with upper and lower flanges 3.25 inches wide. Other sized I-beams may also be used, and other cross-sections could be used for transversely extending cross members 810, 820.

Transversely extending cross member 810 is secured to vertical support 830 via flange member 837 via bolts 834a and 834b on a horizontal component of flange member 837 and via bolts 837a and 837b and bolts 837c and 837d extending through a vertical component of flange member 837. Transversely extending cross member 820 is secured to vertical support 840 in the same manner, although could be constructed differently. A horizontal cross member 835 is also used to connect vertical supports 830, 840, and also support cylinder 900 which is used to extend pushing block 874 across the conveyor belt 740 when separating the springs from the frame of the mattress box spring.

Although not required, in this embodiment bearing assemblies 850 and 850a are identical, so the details will be described with respect to bearing assembly 850, with bearing assembly 850a constructed in the same manner as bearing assembly 850. Bearing assembly 850 includes four pillow block bearings 880a-d. Upper pillow block bearings 880a and 880b ride on the top flange of transversely extending cross member 810 and lower pillow block bearings 880c and 880c ride beneath the lower flange of transversely extending cross member 810. Upper pillow block bearings 880a and 880b support the pushing block 874 that is secured beneath the bearing assembly 850. Lower pillow block bearings 880c and 880d carry the load of any upward force encountered as the pushing block 874 extends over the frame of a mattress box spring as during the separation of the springs from the frame of the bed spring. Although in this embodiment pillow block bearings are used, other types of bearings could also be used and in some embodiments, no bearings could be used at all. For example, low friction slides could be used.

Bearing assembly 850 includes a first upper side plate 854 bolted to a descending flange of flange member 852 with bolts 855a-c. Lower side plate 858 is bolted to an upwardly extending flange of lower plate 860 with bolts 857a-c, which is in turn bolted to an upper plate 872 welded to pushing block 874 with bolts 861a and 861b and other bolts. A central horizontally extending plate 856 is bolted to a central section of the plate extending between upper plate 854 and lower plate 858. The opposite side of bearing assembly 850 is similarly constructed and includes another set of four pillow block bearings and a rolling member extends between each of the four pairs of pillow block bearings.

The transversely extending cross members 810 and 820 serve to guide the pushing block 874 as it is extended over the frame of a mattress box spring to separate the springs from the frame. It is also contemplated that additional guide rails could be positioned above the cross members 810, 820 to further guide the pushing block 874 as it separates the springs from the frame of the mattress box spring.

Pushing block assembly 870 is suspended beneath the bearing assembly 850. Pushing block assembly 870 includes upper plate 872 bolted to the lower plate 860 of bearing assembly 850, which is also bolted to lower side plate 858 of bearing assembly 850. Approximately 75-80% of the frames of mattress box springs have a thickness of about 1.75 to 2 inches, although some mattress box springs are thinner or thicker. To accommodate such non-standard mattress box springs, shims may be added or removed between the lower plate 860 of bearing assembly 850 and upper plate 872 of pushing block assembly 870 above pushing block 874 when separating the springs from a mattress box spring having a frame with a non-standard thickness.

Pushing block assembly 870 includes pushing block 874 attached to the upper plate 872. Pushing block 874 may be angled from vertical, to act like a snow plow to move the springs away from the frame of the mattress box spring during the spring separation process. In some embodiments, the pushing block 874 may have a front surface rearwardly angled from vertical at an angle of 20-40 degrees, although other angles may also be used.

A bottom plate 876 is attached to the bottom of pushing block 874 and includes a forwardly extending shearing plate 876a and rearwardly extending suppression plate 876b. Shearing plate 876a is positioned at a height to scrape the springs from the frame of a mattress box spring when extended over the conveyor belt 740 by cylinder 900. The shearing plate may be ⅜ inch thick steel and provides the point of separation between the springs and the frame of the mattress box spring. The rearwardly extending suppression plate 876b prevents the components of the frame from buckling during the spring separation process. In this embodiment, the shearing plate 876a and the suppression plate 876b are formed from a single plate attached to the bottom of pushing block 874. In other embodiments, they may be constructed, and attached to the bottom of pushing 874, as separate plates.

A plurality of forks 878a-d (best seen in FIG. 16), including fork 878a-d, transversely extend in front of the pushing block 874 and serve to prevent the springs from rolling over and extending underneath the shearing plate 876a and pushing block 874 as pushing block 874 is extending over the frame of a mattress box spring to separate the springs from the frame of the mattress box spring. In this embodiment, the plurality of forks 878a-d are welded to the top of shearing plate 876a, although in other embodiments they could be attached to the front of the pushing block 874. The plurality of forks 878a-d may extend from the front surface of shearing plate 876a 10 inches or more, and may be constructed of ¾ inch thick steel plate and may 1½ inches wide. Other materials and dimensions could be used for the plurality of forks 878a-d, and fewer or more forks may also be used.

Figure 15:
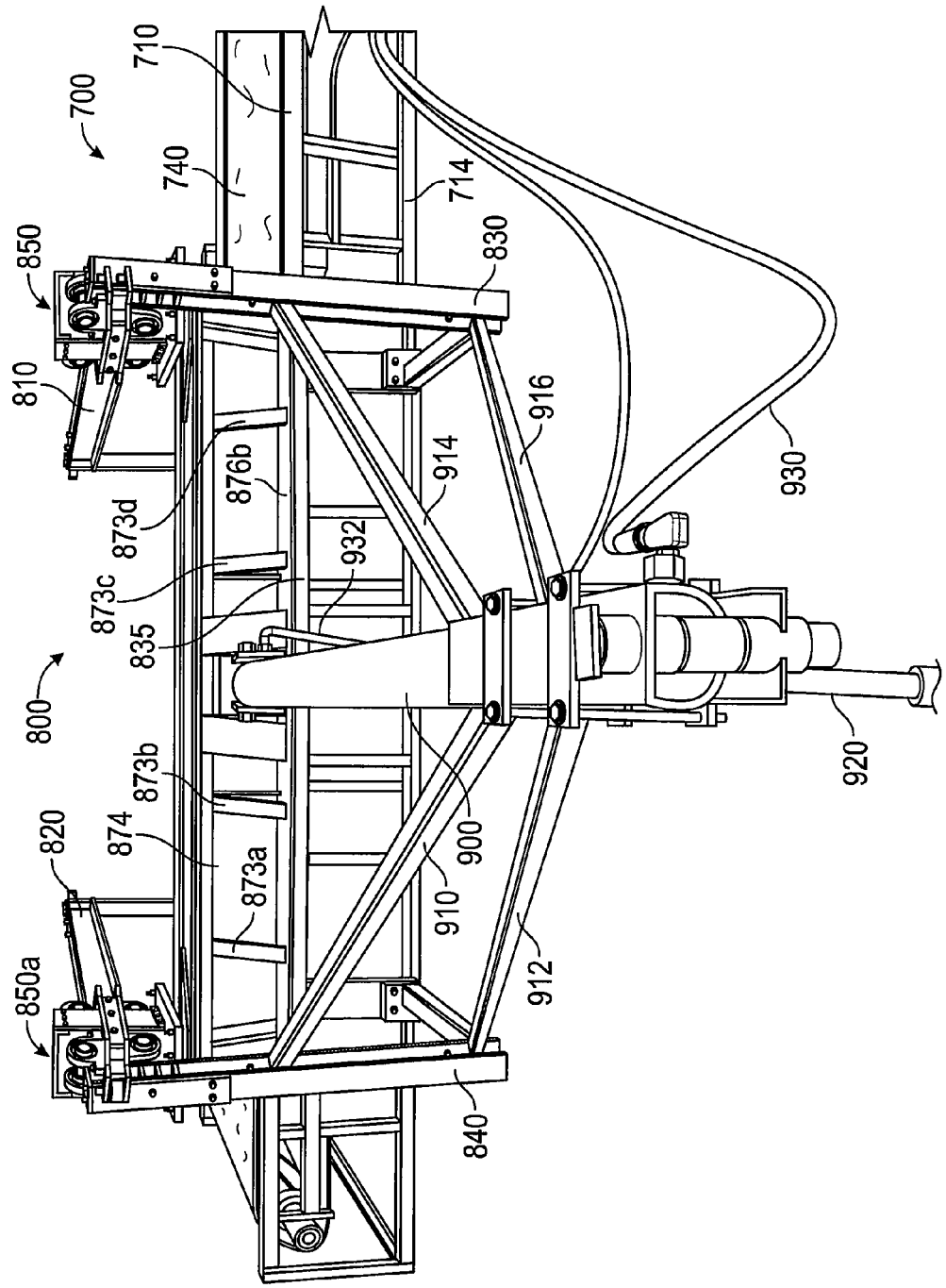
FIG. 15 is a perspective side view showing the back side of pushing block support frame 800 and cylinder 900.

FIG. 15 is a perspective side view showing the back side of pushing block support frame 800 and cylinder 900. In FIG. 15, pushing block 874 is shown secured to, and extending beneath, bearing assemblies 850 and 850a. Cylinder 900 is positioned adjacent conveyor belt assembly 700 and conveyor belt 740. As cylinder 900 is extended, pushing block 874 extends transversely across conveyor belt 740, and bearing assemblies 850 and 850a, attached to pushing block 874, ride over transversely extending cross members 810, 820 and serve as trollies to support the pushing block 874 as it extends over conveyor belt 740.

A plurality of angled support members 873a-d are shown attached to pushing block 874 and suppression plate 876b. The support members 873a-d help to prevent the suppression plate 876b from upwardly extending during the separation process, and therefore assist the suppression plate 876b in helping to prevent upward movement or buckling of the frame of the mattress box spring during the separation process.

The cylinder 900 is secured to the rear side of pushing block 874 and is supported on a front end by horizontal cross member 835, and is supported on a rear end by a cylinder support assembly positioned over a vertical leg 920. Cylinder support arms 910 and 912 are attached to the cylinder support assembly at one end and to vertical support 840 at the other end. Similarly, support arms 914, 916 are attached at one end to the cylinder support assembly and at the other end to vertical support member 830. In one embodiment the support arms 910, 912, 914, and 916 are 8 feet long and are constructed of 2×2 inch square tube steel having a thickness of ¼ inch.

The cylinder 900 may be a hydraulic cylinder powered by a 60 horsepower electric 460 3-phase motor. Hydraulic hoses 930, 932 may communicate with a hydraulic system that may have a 60-gallon reservoir of hydraulic fluid and operate at 1500 psi. Other hydraulic systems may also be used. In one embodiment, the cylinder 900 has a cylinder tube with an inner diameter of 5 inches, and a piston rod having a diameter of 3 inches. The cylinder 900 may have a travel of 7 feet, 10 inches, to provide sufficient travel for the pushing block 874 to extend beyond the far edge of the frame of the mattress box spring during the spring separation process. The end of the cylinder rod may be pinned through sleeves welded to the back of the pushing block 874. In one embodiment, a sleeve may be welded to the end of the cylinder rod having a 2.5 inch outer diameter and adapted to receive a 2-inch diameter pin. Similarly, sleeve portions may be attached or welded to the back of the pushing block 874 and positioned on opposite sides of the sleeve on the end of the cylinder rod to provide a pinned attached between the cylinder rod and the back of the pushing block 874. A clevis pin or other means of attachment may also be used to attach the end of the cylinder rod to the back of the pushing block 874.

Figure 16:
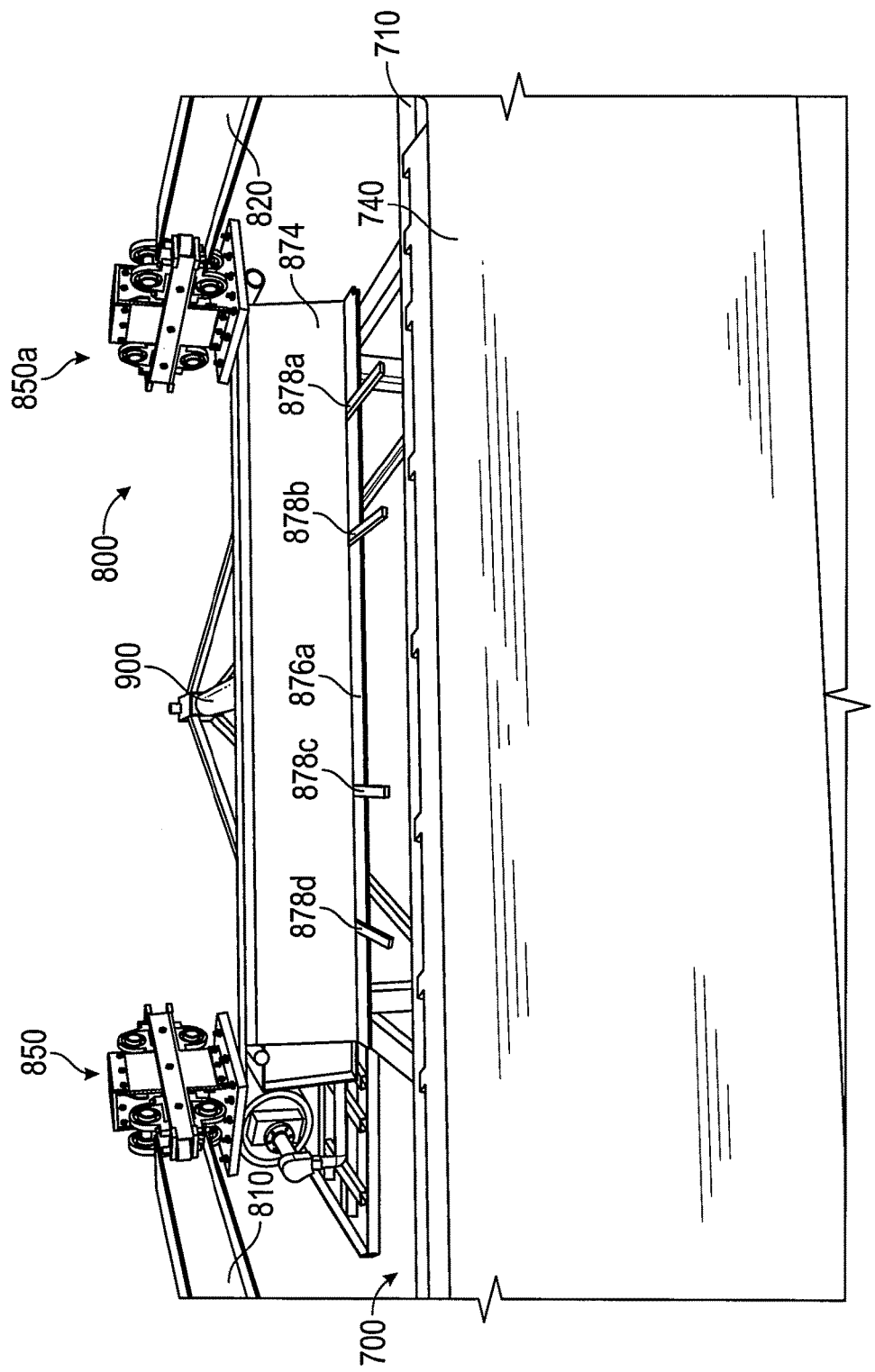
FIG. 16 is a perspective side view showing the front side of pushing block 874 positioned adjacent conveyor belt 740.

FIG. 16 is a perspective side view showing the front side of pushing block 874 positioned adjacent conveyor belt 740 and conveyor belt frame 710 of conveyor belt system 700. In FIG. 16, the cylinder 900 is in its retracted state such that the pushing block 874 is positioned to the side of the conveyor belt 740 to allow a mattress box spring to be moved into position in front of the pushing block 874. Once a mattress box spring is moved into the proper position in front of the pushing block 874, the conveyor belt is stopped. This may be done manually by an operator, or automatically such as if an electric eye is triggered, or a laser beam is interrupted by the mattress box spring.

Once the mattress box spring is in position, the cylinder 900 is extended and the pushing block 874 is moved over the frame of the mattress box spring and is supported and guided by bearing assembly 850 over transversely extending cross member 810 and by bearing assembly 850a over transversely extending cross member 820. Pushing block 874 includes a shearing plate 876a extending in front of the bottom of pushing block 874 that scrapes the springs from the frame of the mattress box spring as the pushing block 874 is extended across the conveyor belt 740 and across the frame of the mattress box spring. Extending forks 878a-d advantageously prevent the springs of the mattress box spring from rolling over and beneath the shearing plate 876a and pushing block 874, and the pushing block 874 "shovels" the springs from over the frame of the mattress box spring and off of the conveyor belt 740 during the spring separation process.

Figure 17:
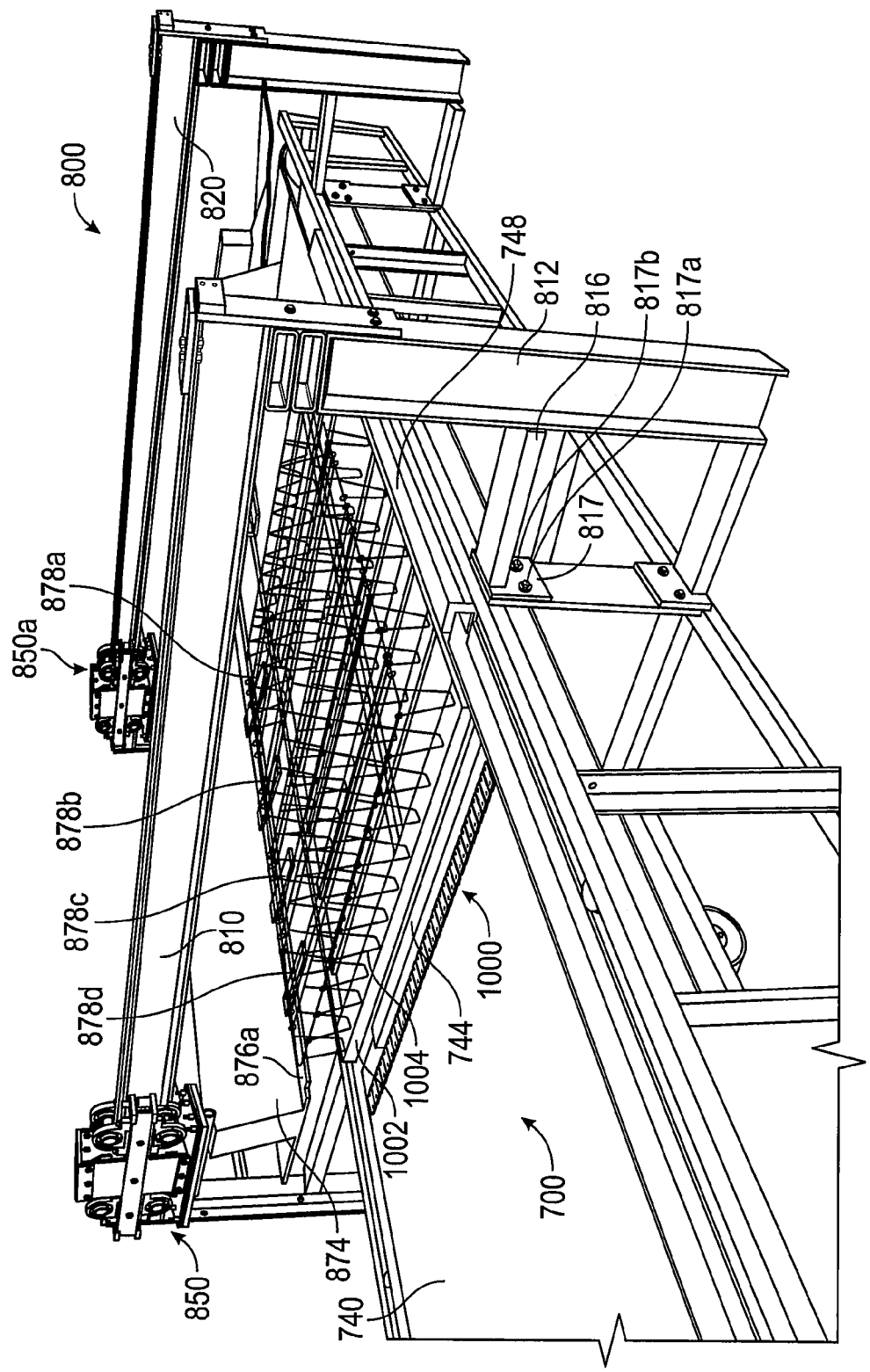
FIG. 17 is a perspective view looking from the rear portion of the conveyor belt system 700 with mattress box spring 1000 positioned on conveyor belt 740 in front of the pushing block 874 just prior to the extension of pushing block 874 across the frame 1002 of mattress box spring 1000.

FIGS. 17-20 show a series of steps during the spring separation process. FIG. 17 is a perspective view looking from the rear portion of the conveyor belt system 700 with mattress box spring 1000 moved into position by raised cleat 744 on conveyor belt 740 in front of the pushing block 874 just prior to the extension of pushing block 874 across the frame 1002 of mattress box spring 1004. Once the mattress box spring 1000 is properly in position, a far edge of the frame 1002 abuts abutment 748. Extending forks 878a-d (best seen in FIG. 16) and shearing plate 876a are in position to separate the springs 1004 from frame 1002 of mattress box spring 1000. Pushing block 874 is supported by bearing assembly 850 and transversely extending cross member 810 of pushing block support frame 800, and by bearing assembly 850a and transversely extending cross member 820 of pushing block frame 800. In this view, horizontal support member 816 can be seen attached to the conveyor belt frame using bolts 817a and 817b extending through lower extending flange 817.

Figure 18:
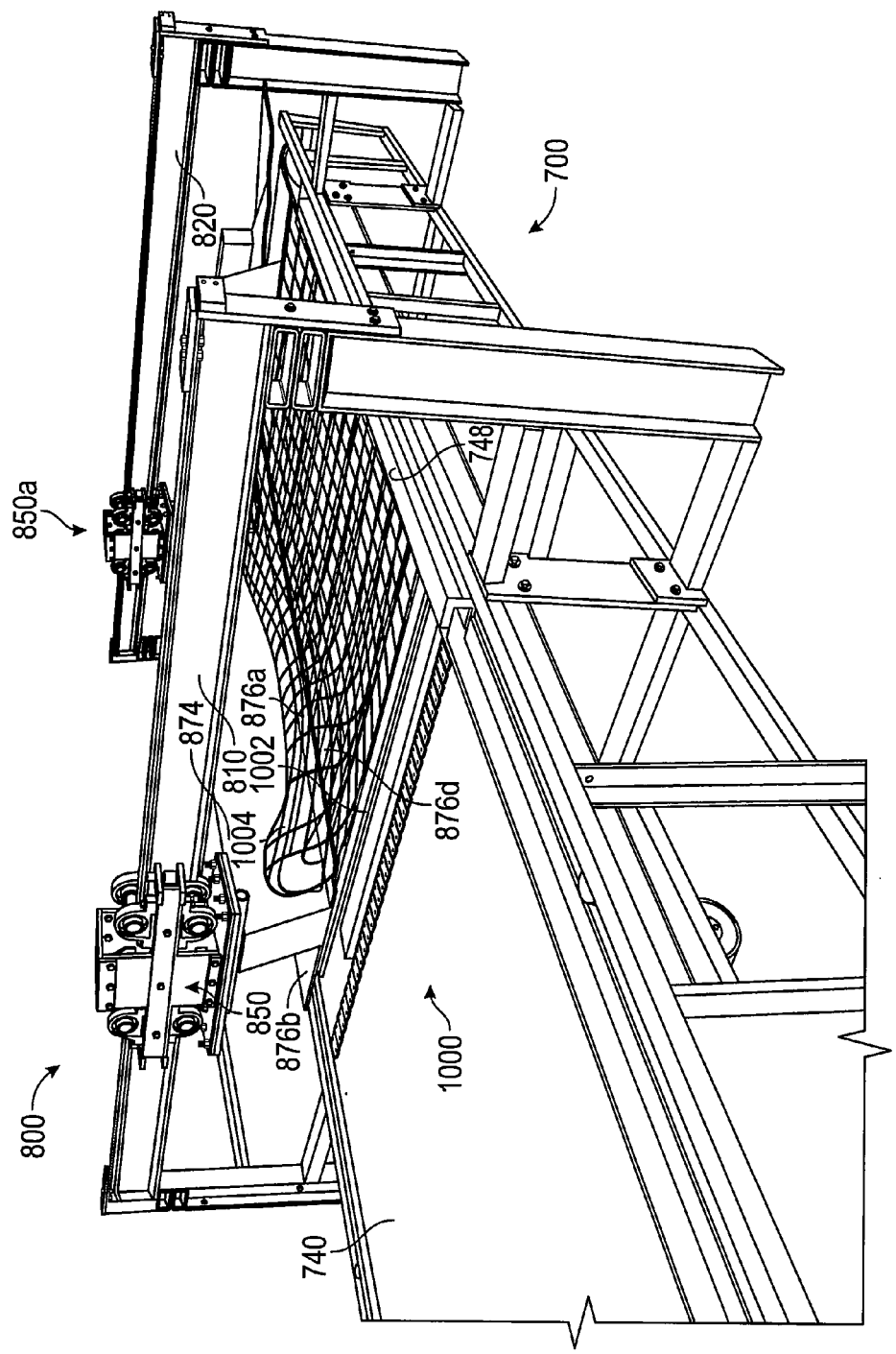
FIG. 18 is a perspective view looking from the rear portion of the conveyor belt system 700 with mattress box spring 1000 positioned on conveyor belt 740 in front of the pushing block 874 after the pushing block 874 has been partially extended across the frame 1002 of mattress box spring 1000 showing pushing block 874 separating the springs 1004 from the frame 1002 of mattress box spring 1000.

FIG. 18 is a perspective view looking from the rear portion of the conveyor belt system 700 with mattress box spring 1000 positioned on conveyor belt 740 in front of the pushing block 874 after the pushing block 874 has been partially extended across the frame 1002 of mattress box spring 1000 showing shearing plate 876a of pushing block 874 separating the springs 1004 from the frame 1002 of mattress box spring 1000. Pushing block 874 remains supported by bearing assembly 850 and transversely extending cross member 810, and by bearing assembly 850 and transversely extending cross member 820. Bearing assemblies 850 and 850a have traveled across transversely extending cross members 810 and 820, respectively to guide the pushing block 874 during the spring separation process.

As shearing plate 876a separates the springs 1004 from the frame 1002 of mattress box spring 1000, the pushing block 874 can be seen "shoveling" the springs 1004 towards the far side of the conveyor belt 740. At the same time extending forks 878a-d (best seen in FIG. 16) serve to prevent the springs 1002 from rolling underneath the shear plate 876a and pushing block 874. Suppression plate 876b is shown positioned over the near edge of frame 1002 of the mattress box spring 1000 to hold the frame 1002 down and prevent upward movement or buckling of the frame 1002.

Figure 19:
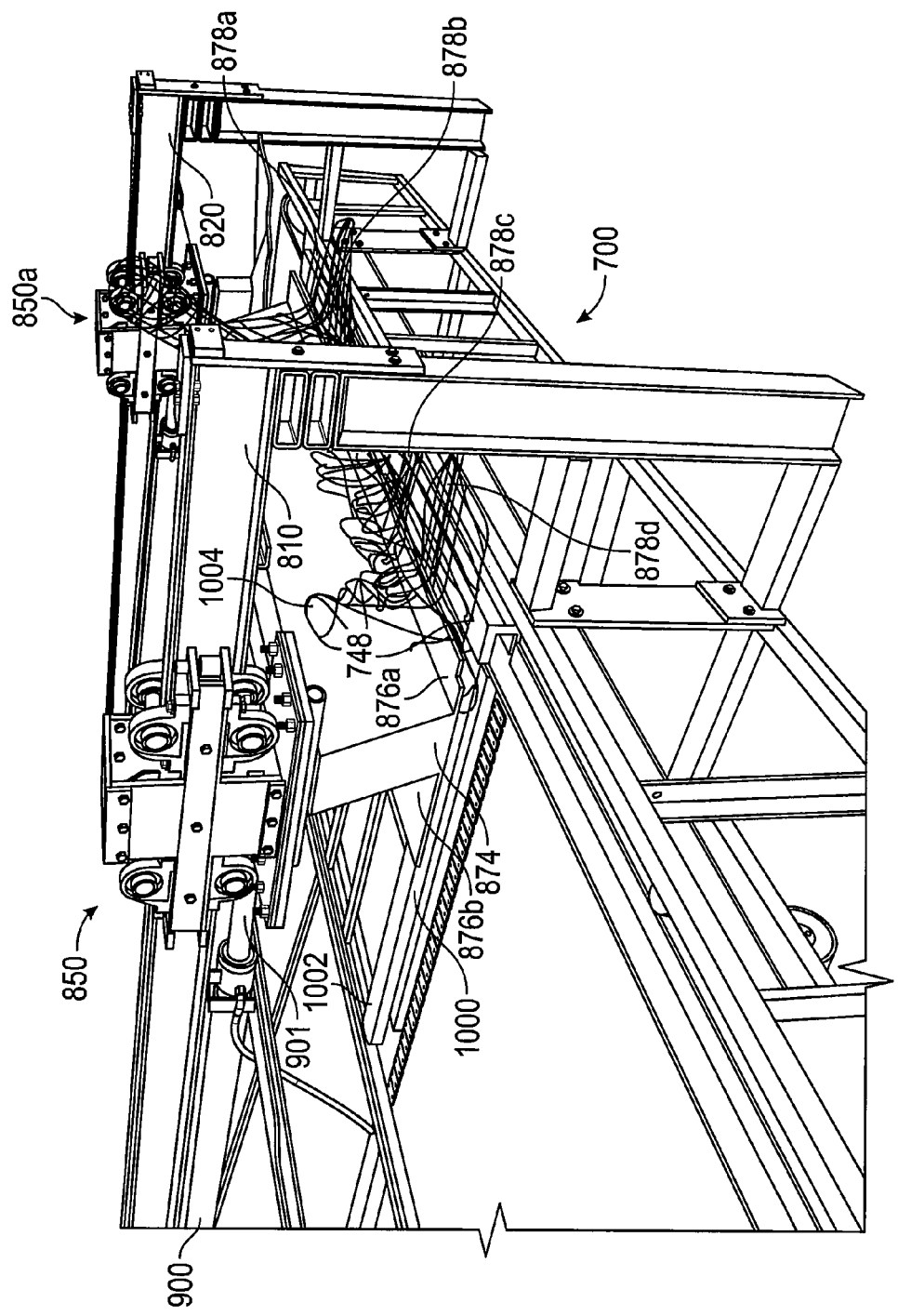
FIG. 19 is a perspective view looking from the rear portion of the conveyor belt system 700 with mattress box spring 1000 positioned on conveyor belt 740 in front of the pushing block 874 after the pushing block 874 has been almost entirely extended across the frame 1002 of mattress box spring 1000 showing pushing block 874 further separating the springs 1004 from the frame 1002 of mattress box spring 1000.

FIG. 19 is a perspective view looking from the rear portion of the conveyor belt system 700 with mattress box spring 1000 positioned on conveyor belt 740 in front of the pushing block 874 after the pushing block has been almost entirely extended across the frame 1002 of mattress box spring 1004 showing pushing block 874 further separating the springs 1004 from the frame 1002 of mattress box spring 1000. Pushing block 874 remains supported by bearing assembly 850 and transversely extending cross member 810, and by bearing assembly 850 and transversely extending cross member 820. Bearing assemblies 850 and 850a have further traveled across transversely extending cross members 810 and 820, respectively to guide the pushing block 874 during the spring separation process. Cylinder rod 901 of cylinder 900 can be seen extending the pushing block 874 forward.

As shearing plate 876a further separates the springs 1004 from the frame 1002 of mattress box spring 1000, the pushing block 874 can be seen "shoveling" the springs 1004 towards the far side of the conveyor belt 740, and over abutment 748. At the same time extending forks 878a-d (best seen in FIG. 16) continue to serve to prevent the springs 1002 from rolling underneath the shear plate 876a and pushing block 874. Suppression plate 876b is shown positioned over the frame 1002 of the mattress box spring 1000 to hold the frame 1002 down and prevent upward movement or buckling of the frame 1002.

Figure 20:
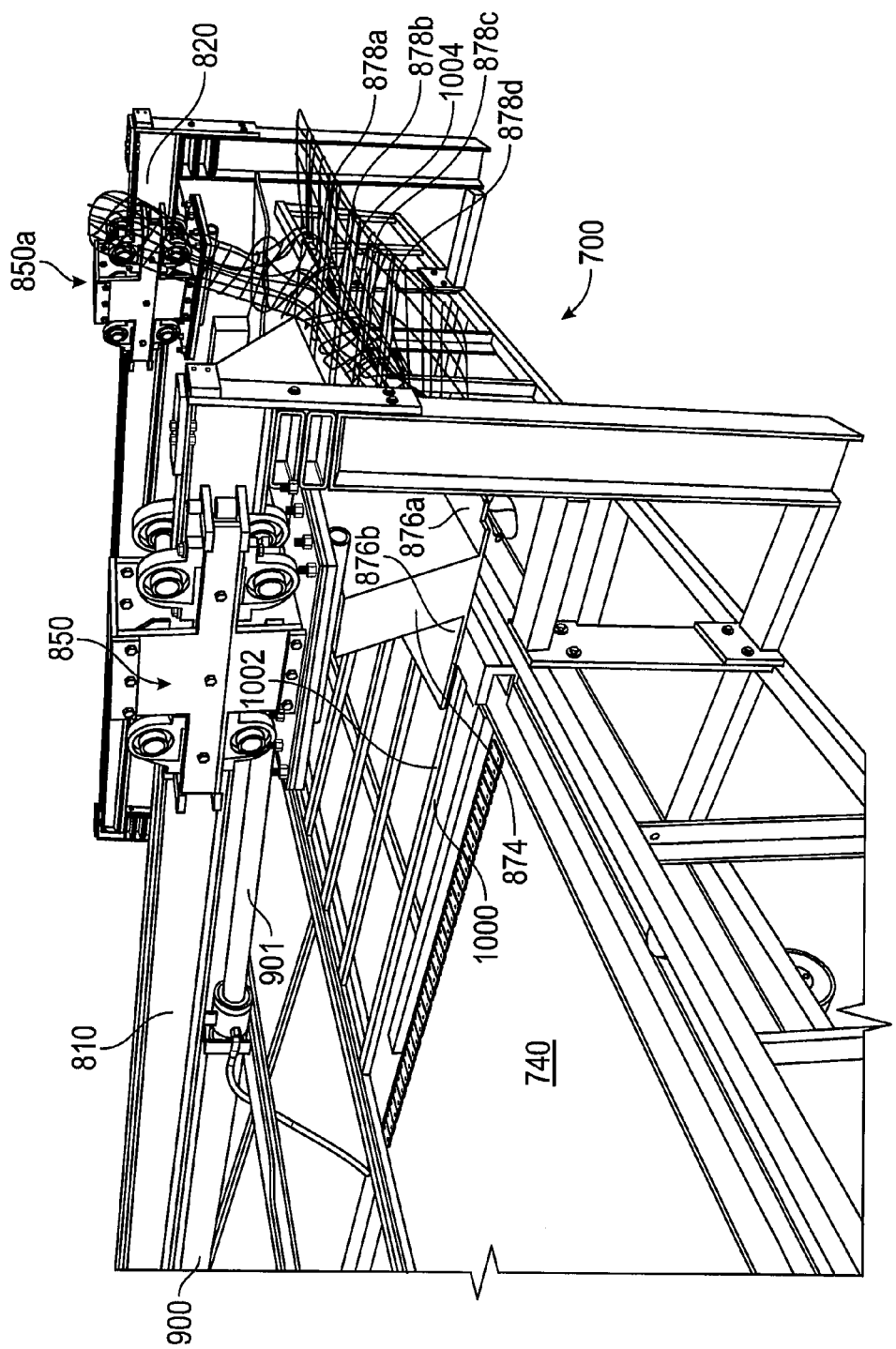
FIG. 20 is a perspective view looking from the rear portion of the conveyor belt system 700 with mattress box spring 1000 positioned on conveyor belt 740 in front of the pushing block 874 after the pushing block 874 has been completely extended across the frame 1002 of mattress box spring 1000 showing that pushing block 874 has completely separated the springs 1004 from the frame 1002 of mattress box spring 1000.

FIG. 20 is a perspective view looking from the rear portion of the conveyor belt system with mattress box spring 1000 positioned on conveyor belt 740 in front of the pushing block 874 after the pushing block 874 has been completely extended across the frame 1002 of mattress box spring 1004 showing that pushing block 874 and shearing plate 876a have completely separated the springs 1004 from the frame 1002 of mattress box spring 1000. Pushing block 874 remains supported by bearing assembly 850 and transversely extending cross member 810, and by bearing assembly 850 and transversely extending cross member 820. Bearing assemblies 850 and 850a have further traveled across transversely extending cross members 810 and 820, respectively to guide the pushing block 874 during the spring separation process. Cylinder rod 901 of cylinder 900 can be seen extending the pushing block 874 forward.

In FIG. 20, shearing plate 876a has completely separated the springs 1004 from the frame 1002 of mattress box spring 1000, and the pushing block 874 has "shoveled" the springs 1004 completely off of the conveyor belt 740. During the spring separation process, the extending forks 878a-d served to prevent the springs 1002 from rolling underneath the shear plate 876a and pushing block 874. Suppression plate 876b is shown positioned over the frame 1002 of the mattress box spring 1000, and served to hold the frame 1002 down and prevent upward movement or buckling of the frame 1002 during the spring separation process.

Although not shown, it is also contemplated that a shield, such as a translucent Plexiglas shield could be provided on the side opposite from the pushing block 874 to provide a shield to protect workers from any staples or fasteners that come loose from the frame 1002 during the spring separation process. The shield could be mounted to the vertical supports 812, 822 (shown in FIG. 13), and the shield may be inwardly angled to deflect any staples or fasteners downwardly.

Once the springs 1004 have been completely separated from frame 1002 of mattress box spring 1000, the cylinder rod 901 of cylinder 900 may be retracted to move the pushing block 874 back into a retracted state. The conveyor belt 740 may be started to convey the frame 1002 off the end of the conveyor 740 where it may be cut up and further processed for recycling. Similarly, the springs 1004 may also be further cut up and processed for recycling.

In FIGS. 17-20, the box spring 1000 has been processed after the cloth and foam have been removed. In the embodiment shown in FIGS. 12-20 the conveyor belt 740 is 32 feet long. However, shorter or longer conveyor belts may also be used. It is also possible to provide a conveyor system that has cloth and foam removal stations for removing the cloth and foam of a mattress box spring prior to reaching the pushing block 874. In this manner a complete mattress box spring recycling method may be provided.

In addition, because of the bolted connections of pushing block support frame 800 and conveyor belt frame 700, the pushing block 874 and cylinder 900 and related supports could be on either the left or right hand side of the conveyor, depending on the layout of the recycling facility.

Example embodiments have been described above. Those skilled in the art will understand that changes and modifications may be made to the described embodiments without departing from the true scope of the present invention, which is defined by the claims.

What is claimed is:

1. A device for removing a set of springs from a mattress box spring, the device comprising:
   a mattress box spring support;
   a pushing block support frame positioned over the mattress box spring support;
   a pushing block supported by the pushing block support frame, the pushing block positionable adjacent to the mattress box spring support and sized to span a length or a width of a frame of a mattress box spring;
   a cylinder operable for providing relative movement between the pushing block and the mattress box spring support in a plane parallel to an upper surface of the mattress box spring support;
   wherein the cylinder is operable to provide relative movement between the pushing block and the frame of the mattress box spring when the mattress box spring is positioned on the mattress box spring support to separate springs attached to the frame of the mattress box spring from the frame of the mattress box spring; and
   wherein a plurality of forks extend in front of the pushing block for helping to prevent the springs from extending beneath a bottom of the pushing block when the pushing block is extended over the mattress box spring to separate the springs from the frame of the mattress box spring.

2. The device of claim 1, wherein a piston rod of the cylinder has a length sufficient to extend a front surface of the pushing block beyond a far end of the frame of the mattress box spring.

3. The device of claim 1, wherein a horizontal shearing plate is secured to a bottom of the pushing block, and extends in front of the pushing block.

4. The device of claim 3, wherein the plurality of forks are attached to a top of the shearing plate.

5. The device of claim 1, wherein the mattress box spring support comprises a conveyor belt frame with a conveyor belt operable to move a mattress box spring into position in front of the pushing block.

6. The device of claim 5, wherein the conveyor belt includes a raised cleat that is operable to abut the mattress box spring to move the mattress box spring down the conveyor belt.

7. The device of claim 1, wherein the pushing block support frame includes a first beam and a second beam that each extend transversely across the mattress box spring support; and wherein the first and second beams are supported on opposite sides of the mattress box spring support by a pair of upwardly extending supports on a near side and a far side of the mattress box spring support.

8. The device of claim 7, wherein the pushing block support frame further comprises a first bearing assembly supported by the first beam and secured to a top of a first end of the pushing block, and a second bearing assembly supported by the second beam and secured to a top of a second end of the pushing block; and wherein the first and second beams and first and second bushing assemblies serve to guide the pushing block when it is extended over the mattress box spring and separating the springs from the frame of the mattress box spring.

9. The device of claim 8, wherein the first and second beams comprise I-beams and the first and second bearing assemblies comprise pillow block bearing assemblies.

10. The device of claim 1, wherein a shield is positioned on a far side of the mattress box spring support to block any staples or nails when the springs of the mattress box spring are being separated from the frame of the mattress box spring.

11. The device of claim 7, wherein a rear end of the cylinder is secured to a cylinder support frame and a first pair of support arms is attached to the cylinder support frame and attached to one of the pair of upwardly extending supports of the pushing block support frame on the near side, and the second pair of support arms is attached to the cylinder support frame and attached to the other of the pair of upwardly extending supports of the pushing block support frame on the near side.

12. The device of claim 1, wherein a far side of the mattress box spring support includes a raised stop to prevent transverse movement of the mattress box spring when the pushing block is extended across the mattress box spring during separation of the springs of the mattress box spring from the frame.

13. The device of claim 1, where the pushing block is rearwardly angled from the conveyor belt at an angle of between 20 and 40 degrees inclusive from vertical.

14. The device of claim 1, further including a frame suppression plate extending rearwardly from the pushing block to suppress movement of the frame of the mattress box spring during removal of the springs from the frame of the mattress box spring.

15. The device of claim 1, wherein the pushing block support frame is secured to the mattress box spring support.

16. The device of claim 1, wherein the box spring is positioned on the box spring support adjacent the pushing block.

17. A device for removing a set of springs from a mattress box spring, the device comprising:

a mattress box spring support;
a pushing block support frame positioned over the mattress box spring support;
a pushing block supported by the pushing block support frame, the pushing block positionable adjacent to the mattress box spring support;
a cylinder for extending the pushing block over a mattress box spring when positioned on the mattress box spring support;

wherein the cylinder is operable to extend the pushing block transversely over a frame of the mattress box spring when positioned on the mattress box spring support to separate springs attached to the frame of the mattress box spring from the frame of the mattress box spring;

wherein the pushing block support frame further comprises a first bearing assembly supported by the first beam and secured to a top of a first end of the pushing block, and a second bearing assembly supported by the second beam and secured to a top of a second end of the pushing block; and wherein the first and second beams and first and second bearing assemblies serve to guide the pushing block when it is extended over the mattress box spring and separating the springs from the frame of the mattress box spring.

18. The device of claim 17, wherein the first and second beams comprise I-beams and the first and second bearing assemblies comprise pillow block bearing assemblies.

19. A device for removing a set of springs from a mattress box spring, the device comprising:

a mattress box spring support;
a pushing block positionable adjacent to the mattress box spring support and sized to span a length or a width of a frame of a mattress box spring;
wherein a cylinder provides relative horizontal movement between the pushing block and the mattress box spring support in a plane parallel to an upper surface of the mattress box spring support;
wherein the cylinder provides relative horizontal movement between the pushing block and the frame of the mattress box spring when the mattress box spring is positioned on the mattress box spring support to separate springs attached to the frame of the mattress box spring from the frame of the mattress box spring;
wherein a horizontal shearing plate is secured to a bottom of the pushing block, and extends in front of the pushing block; and
wherein the pushing block extends upwardly and rearwardly from the shearing plate.

20. The device of claim 19, wherein a plurality of forks extend in front of the pushing block for helping to prevent the springs from extending beneath a bottom of the pushing block when the pushing block is extended over the mattress box spring to separate the springs from the frame of the mattress box spring.

21. A method of separating springs from a frame of a mattress box spring, comprising the steps of:

providing a device comprising a mattress box spring support, a pushing block support frame positioned over the mattress box spring support, a pushing block supported by the pushing block support frame, the pushing block positionable adjacent to the mattress box spring support and sized to span a length or a width of a frame of a mattress box spring, a cylinder operable for providing relative movement between the pushing block and the mattress box spring support in a plane parallel to an upper surface of the mattress box spring support, wherein the cylinder is operable to provide relative movement between the pushing block and the frame of the mattress box spring when the mattress box spring is positioned on the mattress box spring support to separate springs attached to the frame of the mattress box spring from the frame of the mattress box spring, and wherein a plurality of forks extend in front of the pushing block for helping to prevent the springs from extending beneath a bottom of the pushing block when the pushing block is extended over the mattress box spring to separate the springs from the frame of the mattress box spring;

positioning the mattress box spring on the mattress box spring support; extending the cylinder to provide relative movement between the pushing block and the frame of the mattress box spring to separate springs on the mattress box spring from the frame of the mattress box spring; and retracting the cylinder.

22. The method of claim 21, wherein a piston rod of the cylinder has a length sufficient to extend a front surface of the pushing block beyond a far end of the frame of the mattress box spring.

23. The method of claim 21, wherein a horizontal shearing plate is secured to a bottom of the pushing block, and extends in front of the pushing block.

24. The method of claim 21, wherein the pushing block support frame includes a first beam and a second beam that each extend transversely across the mattress box spring support; wherein the first and second beams are supported on opposite sides of the mattress box spring support from the pushing block frame by a pair of upwardly extending supports on a near side and a far side of the mattress box spring support;

wherein the pushing block support frame further includes a first bearing assembly that is supported by the first beam and secured to a top of a first end of the pushing block, and a second bearing assembly that is supported by the second beam and secured to a top of a second end of the pushing block; and wherein the first and second beams and first and second bushing assemblies serve to guide the pushing block when it is extended over the mattress box spring during separation of the springs from the frame of the mattress box spring.

\* \* \* \* \*